US012322268B2

(12) United States Patent
Ophardt et al.

(10) Patent No.: US 12,322,268 B2
(45) Date of Patent: Jun. 3, 2025

(54) FLUID DISPENSER WITH ILLUMINABLE COVER

(71) Applicant: OP-Hygiene IP GmbH, Niederbipp (CH)

(72) Inventors: Heiner Ophardt, Arisdorf (CH); Hendrik Ophardt, Vineland (CA)

(73) Assignee: OP-HYGIENE IP GMBH, Niederbipp (CH)

( * ) Notice: Subject to any disclaimer, the term of this patent is extended or adjusted under 35 U.S.C. 154(b) by 373 days.

(21) Appl. No.: 17/903,693

(22) Filed: Sep. 6, 2022

(65) Prior Publication Data

US 2023/0077894 A1 Mar. 16, 2023

Related U.S. Application Data

(60) Provisional application No. 63/242,842, filed on Sep. 10, 2021.

(51) Int. Cl.

| | |
|---|---|
| ***G08B 21/18*** | (2006.01) |
| ***A47K 5/12*** | (2006.01) |
| ***G08B 5/36*** | (2006.01) |
| ***G09F 13/08*** | (2006.01) |
| ***G09F 23/00*** | (2006.01) |
| ***G09F 23/04*** | (2006.01) |

(52) U.S. Cl.

CPC ............ *G08B 21/18* (2013.01); *A47K 5/1202* (2013.01); *A47K 5/1205* (2013.01); *A47K 5/1217* (2013.01); *G08B 5/36* (2013.01); *G08B 21/182* (2013.01); *G09F 13/08* (2013.01); *G09F 23/0081* (2021.05); *G09F 23/04* (2013.01)

(58) Field of Classification Search

CPC ........ G08B 21/18; G08B 5/36; G08B 21/182; A47K 5/1202; A47K 5/1217; A47K 5/1205; G09F 13/08; G09F 23/04; G09F 23/0081

See application file for complete search history.

(56) References Cited

U.S. PATENT DOCUMENTS

| | | | | |
|---|---|---|---|---|
| 6,862,148 | B2 * | 3/2005 | Kakinoki | G09F 13/0409 359/809 |
| 7,748,573 | B2 * | 7/2010 | Anhuf | A47K 5/12 16/361 |
| 8,201,707 | B2 | 6/2012 | Ophardt | |
| 9,497,428 | B2 * | 11/2016 | Gaisser | G16H 40/20 |
| 9,974,416 | B2 | 5/2018 | Buckalter et al. | |
| 11,350,796 | B2 * | 6/2022 | Ophardt | A47K 5/1207 |
| 2004/0064990 | A1 | 4/2004 | Kakinoki et al. | |
| 2015/0022361 | A1 | 1/2015 | Gaisser et al. | |
| 2021/0030216 | A1 | 2/2021 | Ophardt et al. | |

* cited by examiner

*Primary Examiner* — Frederick C Nicolas
(74) *Attorney, Agent, or Firm* — Thorpe North & Western, LLP

(57) ABSTRACT

An apparatus has an illumination device and an illuminatable structure. The illuminatable structure has a laminate material having an opaque first side layer, a light transmitting middle layer, and an opaque second side layer. The illuminatable structure also has a light display area where the light transmitting middle layer is exposed. The illumination device emits light into the light transmitting middle layer of the illuminatable structure, and the light transmitting middle layer transmits the light to the light display area so that the light display area becomes illuminated.

20 Claims, 15 Drawing Sheets

FLUID DISPENSER WITH ILLUMINABLE COVER

RELATED APPLICATION

This application claims priority to the Sep. 10, 2021 filing date of U.S. Provisional Patent Application No. 63/242,842, which is incorporated herein by reference.

FIELD OF THE INVENTION

This invention relates to hand cleaning fluid dispensers, and more particularly to dispensers that display information to a user, such as by illuminating a light emitting diode.

BACKGROUND OF THE INVENTION

Hand cleaning fluid dispensers are known that incorporate one or more LED lights that can be illuminated to convey information to a user. For example, U.S. Pat. No. 8,201,707 to Ophardt, issued Jun. 19, 2012, discloses a hand cleaning fluid dispenser that estimates the dose of hand cleaning fluid dispensed onto a user's hand. If a predetermined minimum dose of fluid has been dispensed, a green light is illuminated on the dispenser adjacent a notice indicating that the minimum dose has been obtained. If the predetermined minimum dose of fluid has not been dispensed, a red light is illuminated adjacent to a notice indicating that the minimum dose has not been obtained and/or requesting the user operate the lever again to dispense additional fluid.

The applicant has appreciated that a problem that arises with known fluid dispensers is that the LED light may not always be readily visible to a user standing in front of the device. This may occur, for example, if the light is located on top of the fluid dispenser and does not directly emit light towards the user's eyes. Known LED lights also typically produce a single point of light, and do not have a visually striking appearance. As such, a user may not notice the light, with the result that the information that was intended to be conveyed to the user may not be received or understood.

SUMMARY OF THE INVENTION

To at least partially overcome some of the disadvantages of previously known methods and devices, the present invention provides an apparatus having an illuminatable structure comprising a laminate material with an opaque first side layer, a light transmitting middle layer, and an opaque second side layer. An illumination device emits light into the light transmitting middle layer, which transmits the light to a light display area so that the light display area becomes illuminated. The applicant has appreciated that the illuminatable structure may be used to convey information to a user of the apparatus, preferably in a visually striking manner.

The illuminatable structure is preferably a known or existing structure of the apparatus which is adapted to be illuminatable. For example, the illuminatable structure could be a shroud or cover of a hand cleaning fluid dispenser. The shroud or cover could thus be used to convey information to a user by illuminating, while also performing its usual functions as a shroud or cover. Adapting an existing structure of the apparatus to be illuminatable preferably reduces material costs, as compared with adding an entirely new structural component to the apparatus whose sole purpose is to be illuminated.

In some preferred embodiments of the invention, the light display area is a forward facing edge of the shroud or cover, where the light transmitting middle layer of the laminate material is exposed. When light is emitted from the illumination device into the light transmitting middle layer, preferably the entire forward facing edge of the shroud or cover becomes illuminated. This preferably provides a visually striking display that is immediately apparent to a user standing in front of the dispenser, so that the information conveyed by the illumination is readily recognized and understood. For example, the entire forward facing edge of the shroud is preferably configured to glow green when a preselected minimum dose of fluid has been dispensed onto a user's hand, and to glow red when less than the preselected minimum dose of fluid has been dispensed onto the user's hand. The prominent and visually unique appearance of the glowing forward facing front edge of the shroud preferably catches the user's attention and increases the likelihood of the user appreciating whether or not the preselected minimum dose of fluid has been dispensed.

The illuminatable structure may also be used to convey other types of information. For example, in some embodiments of the invention the illuminatable structure could be used to provide an indication of the volume of the fluid remaining in the dispenser. This information could be used, for example, by maintenance staff to determine when a fluid reservoir needs to be refilled or replaced.

Optionally, the illuminatable structure has more than one light display area that may be illuminated at different times and/or in different colors to convey a variety of different information. For example, the front edge of the shroud could be divided into a lower light display area, a middle light display area, and an upper light display area. To indicate when the fluid reservoir is full, all three light display areas could be illuminated, for example with blue light. When the fluid reservoir is less than half full, this could be indicated by illuminating only the lower and middle light display areas. When the fluid reservoir is less than one quarter full, this could be indicated by illuminating only the lower light display area. Optionally, when the reservoir is empty, all three light display areas could be illuminated for example in red, to indicate to users that the dispenser is out of order and requires service.

To independently illuminate the different light display areas, the light transmitting middle layer can be divided into multiple light transmitting zones, with barriers positioned between the light transmitting zones that prevent light from being transmitted between the light transmitting zones. The light transmitting zones could, for example, be formed from a translucent light transmitting plastic, and the barriers could be formed by an opaque light blocking plastic. The opaque first and second side layers of the laminate material are optionally formed from metal, such as aluminum or stainless steel.

Accordingly, in a first aspect the present invention resides in an apparatus comprising: an illumination device; and an illuminatable structure; wherein the illuminatable structure comprises a laminate material having an opaque first side layer, a light transmitting middle layer, and an opaque second side layer; wherein the illuminatable structure has a light display area where the light transmitting middle layer is exposed; and wherein the illumination device emits light into the light transmitting middle layer of the illuminatable structure, and the light transmitting middle layer transmits the light to the light display area so that the light display area becomes illuminated.

In a second aspect, the invention resides in an apparatus, which optionally incorporates one or more features of the first aspect, wherein the light display area comprises an edge of the laminate material.

In a third aspect, the invention resides in an apparatus, which optionally incorporates one or more features of one or more of the first and second aspects, further comprising a controller that controls the illumination device; wherein the controller controls the emission of the light from the illumination device to convey information to a user of the apparatus.

In a fourth aspect, the invention resides in an apparatus, which optionally incorporates one or more features of one or more of the first to third aspects, wherein the information conveyed to the user of the apparatus comprises information about the apparatus.

In a fifth aspect, the invention resides in an apparatus, which optionally incorporates one or more features of one or more of the first to fourth aspects, wherein the apparatus is a dispensing apparatus for dispensing a material; and wherein the information conveyed to the user of the apparatus comprises at least one of: information about a quantity of the material remaining in the dispensing apparatus; information about an operational state of the dispensing apparatus; information about a quantity of the material that has been dispensed from the dispensing apparatus; information about whether the dispenser is out-of-order; and information about whether the dispenser requires servicing.

In a sixth aspect, the invention resides in an apparatus, which optionally incorporates one or more features of one or more of the first to fifth aspects, wherein the dispensing apparatus comprises a fluid dispenser for dispensing hand cleaning fluid; and wherein the information conveyed to the user of the apparatus comprises information about a quantity of the hand cleaning fluid that has been dispensed onto the user's hand.

In a seventh aspect, the invention resides in an apparatus, which optionally incorporates one or more features of one or more of the first to sixth aspects, wherein the controller changes an operational state of the illumination device when a threshold quantity of the hand cleaning fluid has been dispensed onto the user's hand.

In an eighth aspect, the invention resides in an apparatus, which optionally incorporates one or more features of one or more of the first to seventh aspects, wherein the controller changes the operational state of the illumination device by at least one of: causing the illumination device to start emitting the light; causing the illumination device to stop emitting the light; and causing the illumination device to emit a different color of the light.

In a ninth aspect, the invention resides in an apparatus, which optionally incorporates one or more features of one or more of the first to eighth aspects, wherein the light transmitting middle layer is divided into at least a first light transmitting zone and a second light transmitting zone; wherein the illuminatable structure further comprises at least one barrier that prevents light from being transmitted between the first light transmitting zone and the second light transmitting zone; wherein the illumination device comprises a first illumination device and the light display area comprises a first light display area, the first illumination device emitting light into the first light transmitting zone, and the first light transmitting zone transmitting the light from the first illumination device to the first light display area so that the first light display area becomes illuminated; and wherein the apparatus further comprises a second illumination device that emits light into the second light transmitting zone, the second light transmitting zone transmitting the light from the second illumination device to a second light display area so that the second light display area becomes illuminated.

In a tenth aspect, the invention resides in an apparatus, which optionally incorporates one or more features of one or more of the first to ninth aspects, wherein the controller controls the emission of the light from the first illumination device and the second illumination device to convey information to the user of the apparatus.

In an eleventh aspect, the invention resides in an apparatus, which optionally incorporates one or more features of one or more of the first to tenth aspects, wherein the information conveyed to the user of the apparatus comprises information about the quantity of the material remaining in the dispensing apparatus; wherein the controller controls the first illumination device and the second illumination device to illuminate the first light display area and the second light display area when there is a first quantity of the material remaining in the dispensing apparatus; wherein the controller controls the first illumination device and the second illumination device to illuminate the first light display area without illuminating the second light display area when there is a second quantity of the material remaining in the dispensing apparatus; and wherein the first quantity is greater than the second quantity.

In a twelfth aspect, the invention resides in an apparatus, which optionally incorporates one or more features of one or more of the first to eleventh aspects, wherein the illuminatable structure comprises a shroud of the dispensing apparatus; wherein the shroud has a forwardly facing front edge; and wherein the forwardly facing front edge comprises the light display area.

In a thirteenth aspect, the invention resides in an apparatus, which optionally incorporates one or more features of one or more of the first to twelfth aspects, wherein the forwardly facing front edge comprises a left side portion, a top portion, and a right side portion; and wherein the light display area includes the left side portion, the top portion, and the right side portion.

In a fourteenth aspect, the invention resides in an apparatus, which optionally incorporates one or more features of one or more of the first to thirteenth aspects, wherein the laminate material has a light receiving area where the opaque first side layer is removed; and wherein the illumination device is positioned adjacent to the light receiving area for directing the emitted light into the light transmitting middle layer.

In a fifteenth aspect, the invention resides in an apparatus, which optionally incorporates one or more features of one or more of the first to fourteenth aspects, wherein the dispensing apparatus further comprises a removable smart cover that carries the illumination device.

In a sixteenth aspect, the invention resides in an apparatus, which optionally incorporates one or more features of one or more of the first to fifteenth aspects, wherein the opaque first side layer and the opaque second side layer comprise a metal.

In a seventeenth aspect, the invention resides in an apparatus, which optionally incorporates one or more features of one or more of the first to sixteenth aspects, wherein the metal comprises at least one of: aluminum, stainless steel, and copper.

In an eighteenth aspect, the invention resides in an apparatus, which optionally incorporates one or more features of one or more of the first to seventeenth aspects, wherein the light transmitting middle layer comprises a light transmitting plastic.

In a nineteenth aspect, the invention resides in an apparatus, which optionally incorporates one or more features of one or more of the first to eighteenth aspects, wherein the light transmitting plastic comprises polyethylene.

In a twentieth aspect, the invention resides in an apparatus, which optionally incorporates one or more features of one or more of the first to nineteenth aspects, wherein the illumination device comprises a light emitting diode.

In a twenty first aspect, the invention resides in an apparatus, which optionally incorporates one or more features of one or more of the first to twentieth aspects, wherein the light emitting diode is capable of selectively emitting at least a first color of light and a second color of light.

In a twenty second aspect, the invention resides in an apparatus, which optionally incorporates one or more features of one or more of the first to twenty first aspects, wherein the opaque first side layer has a thickness of about 0.5 mm, the light transmitting middle layer has a thickness of about 2 mm, and the opaque second side layer has a thickness of about 0.5 mm.

In a twenty third aspect, the invention resides in a method of operating an apparatus, which optionally incorporates one or more features of one or more of the first to twenty second aspects, the apparatus comprising: an illumination device; and an illuminatable structure; wherein the illuminatable structure comprises a laminate material having an opaque first side layer, a light transmitting middle layer, and an opaque second side layer; and wherein the illuminatable structure has a light display area where the light transmitting middle layer is exposed; the method comprising: emitting light from the illumination device into the light transmitting middle layer of the illuminatable structure, the light transmitting middle layer transmitting the light to the light display area so that the light display area becomes illuminated.

In a twenty fourth aspect, the invention resides in the method of operating an apparatus in accordance with the twenty third aspect, wherein the apparatus comprises the apparatus in accordance with any one of the first to twenty second aspects.

BRIEF DESCRIPTION OF THE DRAWINGS

Further aspects and advantages of the invention will appear from the following description taken together with the accompanying drawings, in which.

DETAILED DESCRIPTION OF THE DRAWINGS

FIGS. 1 to 6 show a fluid dispenser 10 in accordance with a first embodiment of the present invention. The fluid dispenser 10 has a construction generally similar to that shown and described in U.S. Pat. No. 7,748,573 to Anhuf et al., issued Jul. 6, 2010, which is incorporated herein by reference.

Figure 1:
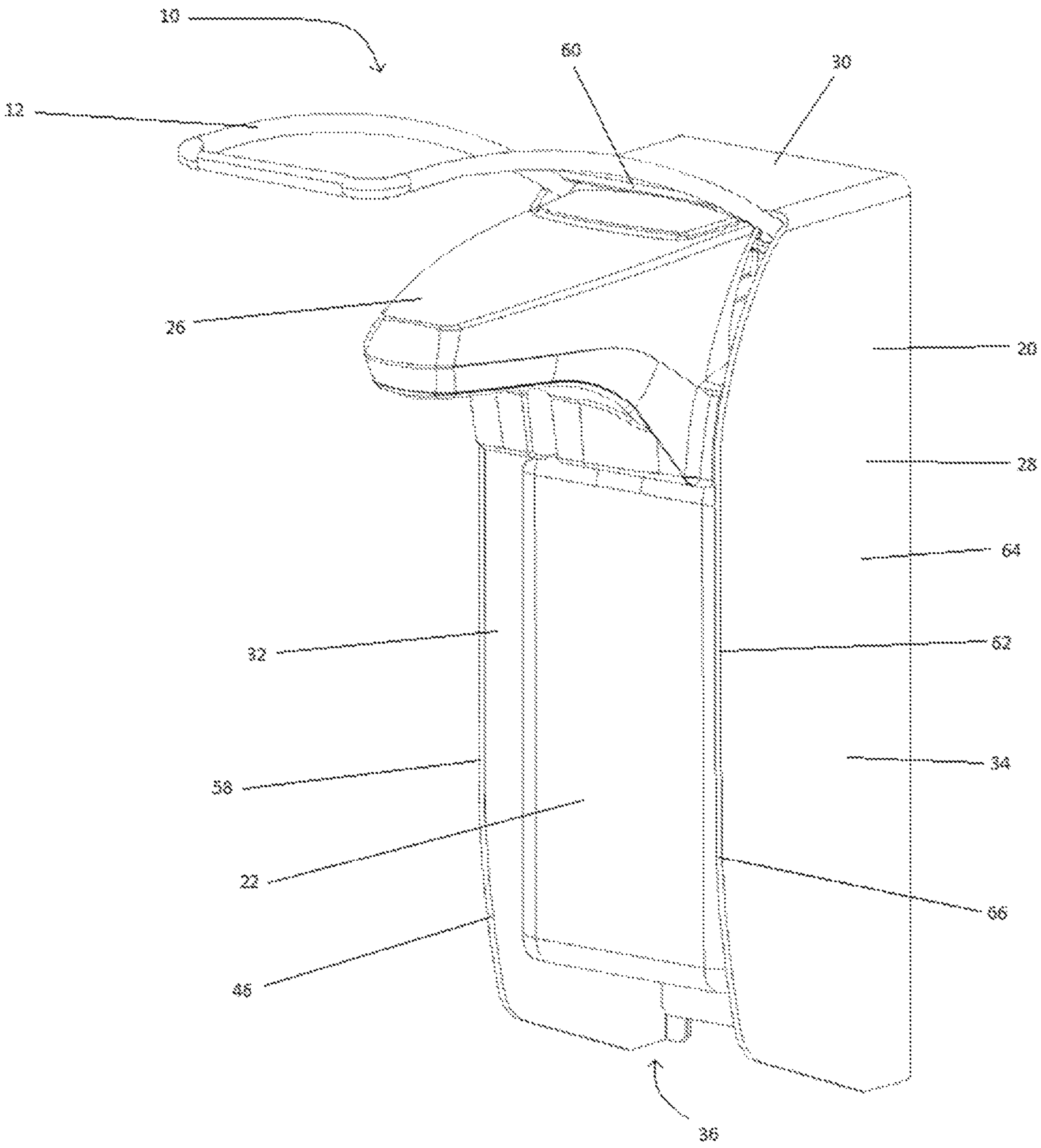
FIG. 1 is a perspective view of a fluid dispenser in accordance with a first embodiment of the present invention, showing an actuator lever of the dispenser at a rest position.
Figure 2:
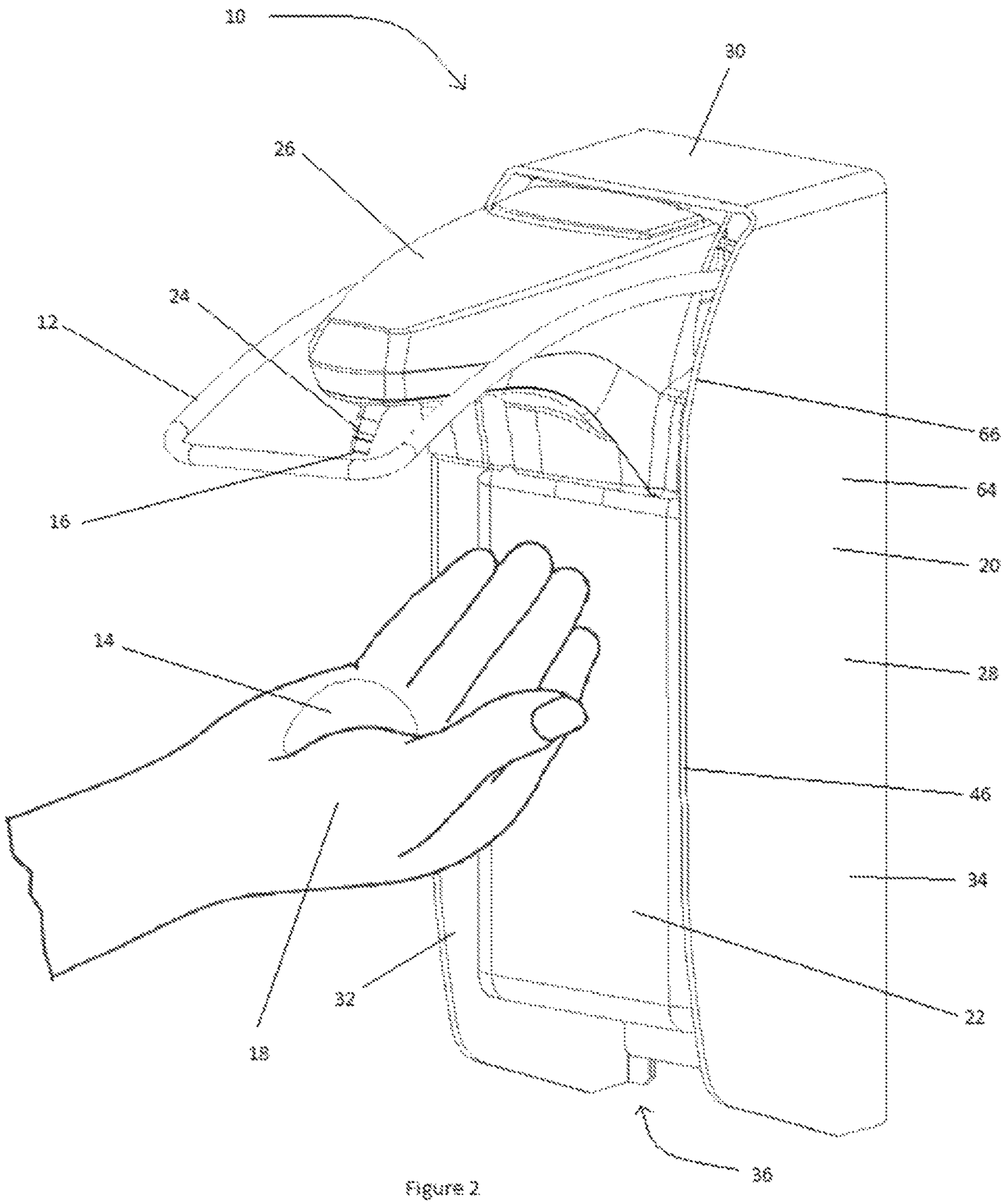
FIG. 2 is a perspective view of the fluid dispenser shown in FIG. 1, with a user's hand shown positioned below a fluid outlet of the dispenser, with the actuator lever at a depressed position and a volume of fluid dispensed onto the user's hand.

The fluid dispenser 10 is adapted to be secured to a wall, not shown, and is adapted for manual activation by a user urging an actuator lever 12 downwardly from the rest position shown in FIG. 1 to the depressed position shown in FIG. 2 so as to dispense hand cleaning fluid 14 from a fluid outlet 16 onto the user's hand 18.

Referring to FIG. 2, the fluid dispenser 10 has a housing 20, a fluid reservoir 22, a pump mechanism 24, the actuator lever 12, and a smart cover 26. The housing 20 includes a shroud 28 which forms a horizontal top wall 30 and two spaced vertical side walls 32 and 34. The shroud 28 has a 90 degree bend where the top wall 30 meets the left side wall 32 and a 90 degree bend where the top wall 30 meets the right side wall 34. Together, the top wall 30 and the two spaced side walls 32 and 34 define an inner cavity 36 therebetween for receiving the fluid reservoir 22.

Figure 4:
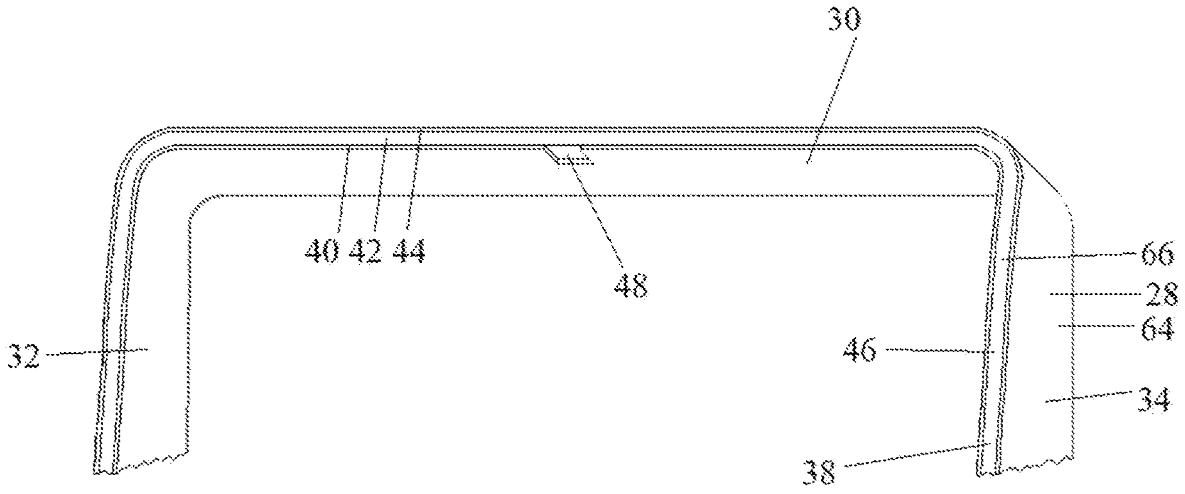
FIG. 4 is an enlarged front perspective view of an upper portion of a shroud of the fluid dispenser shown in FIG. 1.

As best shown in FIG. 4, the shroud 28 is formed from a laminate material 38 having an opaque first side layer 40, a light transmitting middle layer 42, and an opaque second side layer 44. The first side layer 40 forms an inner surface of the shroud 28 and the second side layer 44 forms an outer surface of the shroud 28. The first side layer 40 and the second side layer 44 are formed from a light blocking material, such as for example aluminum, stainless steel, copper, or another type of metal. The light transmitting middle layer 42 is sandwiched between the first side layer 40 and the second side layer 44, and is formed from a light transmitting material, such as for example a translucent polyethylene or another type of light transmitting plastic.

As can be seen in FIG. 4, the light transmitting middle layer 42 is exposed forwardly at a forward facing edge 46 of the shroud 28. The laminate material 38 also has a small rectangular light receiving area 48 located at the center of the front edge of the top wall 30 of the shroud 28. The opaque first side layer 40 is removed from the light receiving area 48, so that a downwardly facing bottom surface of the light transmitting middle layer 42 is exposed in the light receiving area 48.

Referring to FIG. 2, the fluid reservoir 22 is a plastic bottle that sits within the inner cavity 36 of the housing 20 and contains a supply of the hand cleaning fluid 14 to be dispensed from the dispenser 10. The hand cleaning fluid 14 may, for example, be hand sanitizer or hand soap. The reservoir 22 may have any suitable structure, such as that shown and described in U.S. Pat. No. 7,748,573 to Anhuf et al., and is removable from the housing 20 so that it can be refilled or replaced when the supply of fluid 14 within the reservoir 22 is running low, as is described and shown in more detail in U.S. Pat. No. 7,748,573 to Anhuf et al.

The pump mechanism 24 is coupled to the fluid reservoir 22 for dispensing the fluid 14 contained in the fluid reservoir 22 out through the fluid outlet 16. The pump mechanism 24 may have any suitable structure, and may for example be in the form of a piston pump assembly as shown and described in U.S. Pat. No. 7,748,573 to Anhuf et al. The pump mechanism 24 is activated by depressing the actuator lever 12 from the rest position of FIG. 1 to the depressed position of FIG. 2, as is known in the art. When the pump mechanism 24 is primed and operating normally, an allotment of the fluid 14 is dispensed from the fluid outlet 16 upon activation of the pump mechanism 24.

The smart cover 26 is removably coupled to the housing 20 and has a similar structure to the nozzle shield shown and described in U.S. Pat. No. 7,748,573 to Anhuf et al. When coupled to the housing 20, the smart cover 26 substantially covers the pump mechanism 24, protecting the pump mechanism 24 from contamination and damage.

Figure 3:
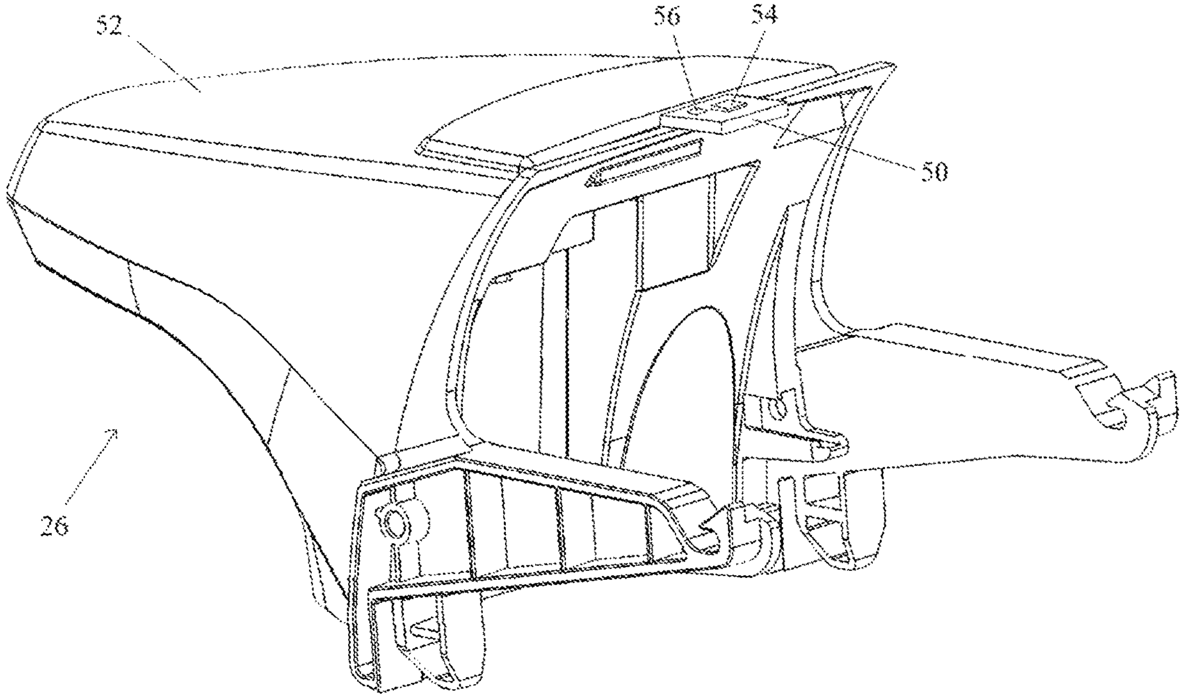
FIG. 3 is a rear perspective view of a smart cover of the fluid dispenser shown in FIG. 1.

As can be seen in FIG. 3, the smart cover 26 has a cover body 52 with a light carrying tab 50 that extends rearwardly from an upper, rearwardly facing edge of the cover body 52. The light carrying tab 50 carries a light emitting illumination device 54 and a controller 56. The illumination device 54 is preferably an LED light that is capable of emitting one, two, three, or more different colors of light, including for example white light, green light, red light, blue light, yellow light, purple light, pink light, and/or orange light. The controller 56 controls the illumination device 54, and may for example be in the form of a computer processor or processors. The illumination device 54 is positioned facing upwardly on the light carrying tab 50 so that, when the smart cover 26 is attached to the housing 20 in the manner as shown in FIGS. 1 and 2, the illumination device 54 is located adjacent to the light receiving area 48 of the shroud 28, with a top surface of the illumination device 54 facing upwardly towards a bottom surface of the light transmitting middle layer 42 so that the light emitted from the illumination device 54 is transmitted into the light transmitting middle layer 42 of the shroud 28.

A preferred manner of operating the fluid dispenser 10 will now be described with reference to FIGS. 1 to 6. To dispense hand cleaning fluid 14 from the fluid outlet 16 onto a user's hand 18, the actuator lever 12 is depressed from the rest position shown in FIG. 1 to the depressed position shown in FIG. 2, as is known in the art. Preferably, the smart cover 26 is configured to determine the volume of fluid 14 dispensed from the fluid dispenser 10 during each user interaction with the dispenser 10, and to provide an indication to the user as to whether or not the volume of fluid 14 dispensed onto the user's hand 18 during the user interaction was equal to or greater than a threshold volume. The threshold volume could, for example, be the volume of hand cleaning fluid 14 that is required for compliance with an applicable hand hygiene protocol in place at the location where the dispenser 10 is located, such as in a hospital or long term care home, for example. The threshold volume could, for example, be 3 ml. Providing an indication to the user as to whether or not the threshold volume of fluid 14 has been dispensed onto the user's hand 18 preferably assists the user in remaining in compliance with the hand hygiene protocol. Any suitable mechanism or method for determining the volume of fluid 14 that has been dispensed from the dispenser 10 could be used, including for example the method described in U.S. Pat. No. 8,201,707 to Ophardt, issued Jun. 19, 2012, which is incorporated herein by reference.

Figure 5:
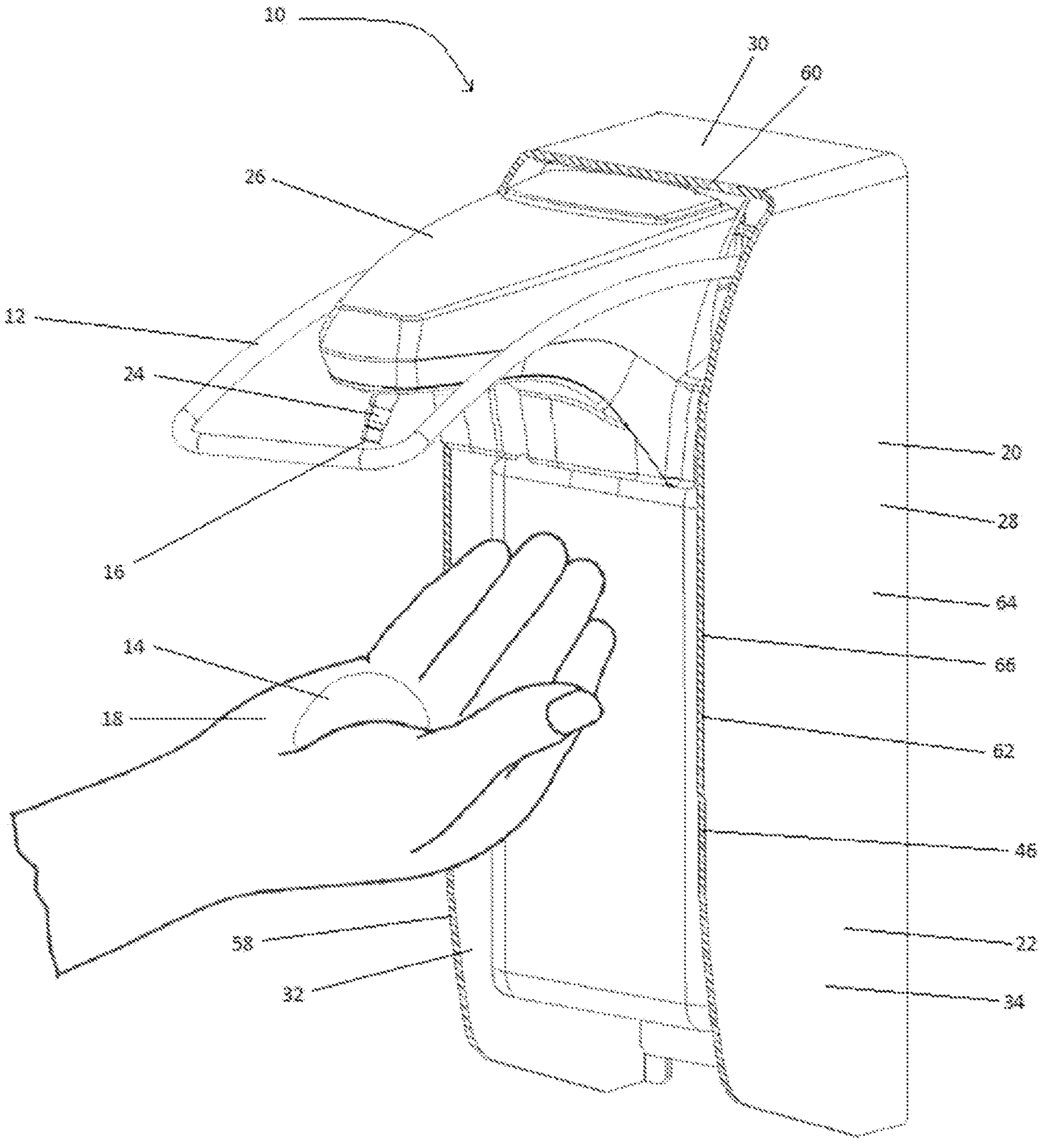
FIG. 5 is a perspective view of the fluid dispenser the same as shown in FIG. 2, but with a forward facing edge of the shroud illuminated with green light.

If the smart cover 26 determines that the volume of fluid 14 dispensed from the fluid dispenser 10 is equal to or greater than the threshold volume, the controller 56 preferably controls the illumination device 54 to emit a green light. The green light is transmitted from the illumination device 54 into the light transmitting middle layer 42 of the shroud 28, which preferably transmits the green light to every exposed surface of the light transmitting middle layer 42 so that the exposed surfaces become illuminated by the green light. More specifically, in the embodiment shown in FIG. 5, the green light is transmitted to the forward facing edge 46 of shroud 28, so that the exposed surface of the light transmitting middle layer 42 along the entire forward facing edge 46 becomes illuminated, including a left side portion 58 of the forward facing edge 46 on the left side wall 32, a top portion 60 of the forward facing edge 46 on the top wall 30, and a right side portion 62 of the forward facing edge 46 on the right side wall 34. The color green is represented in FIG. 5 by diagonal stripes.

The illuminated forward facing edge 46 of the shroud 28 preferably has a visually striking appearance that is immediately noticeable by the user, so that the user recognizes and understands from the green light that a sufficient volume of the fluid 14 has been dispensed.

Figure 6:
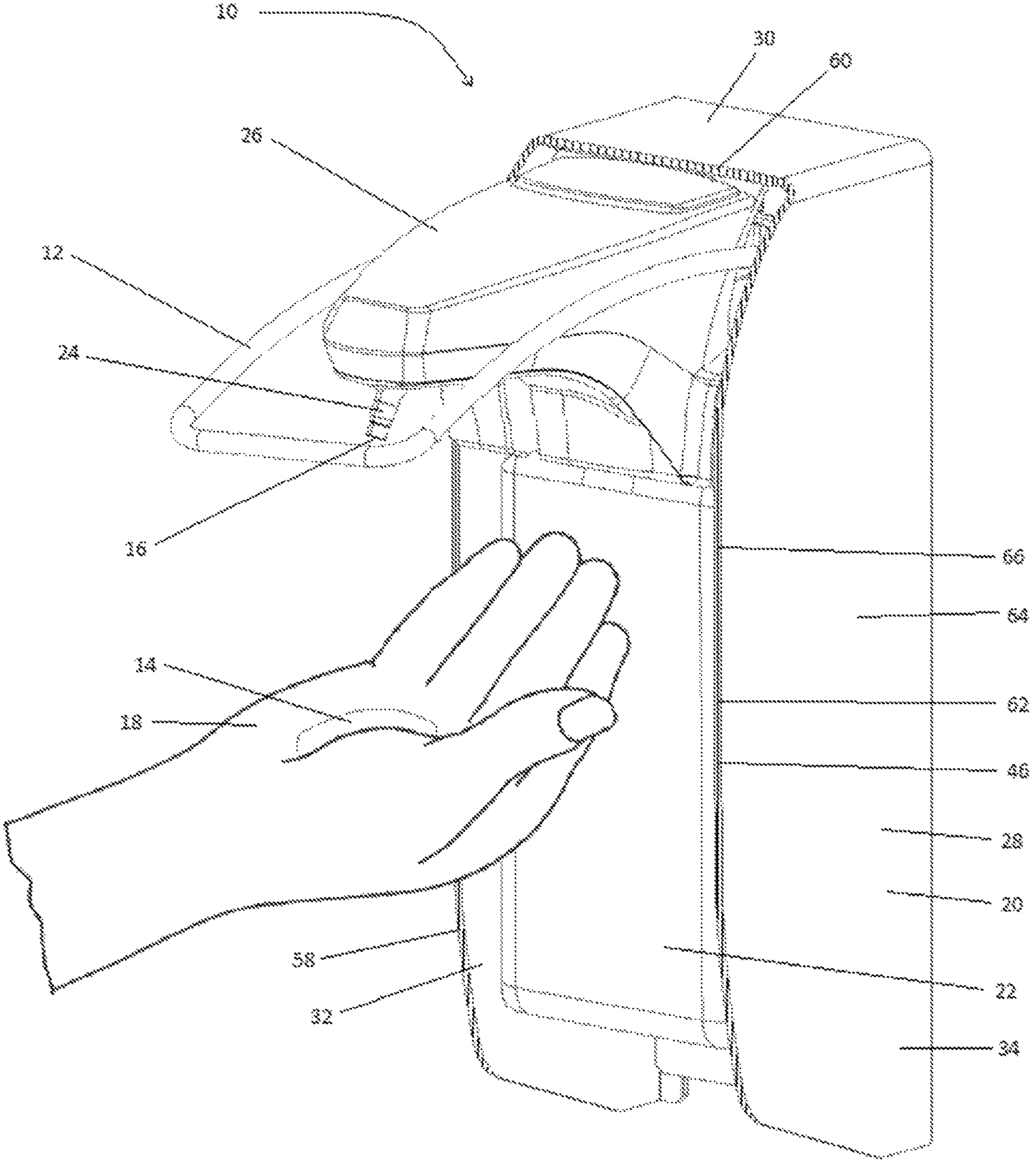
FIG. 6 is a perspective view of the fluid dispenser the same as shown in FIG. 5, but with a smaller volume of fluid dispensed onto the user's hand, and with the forward facing edge of the shroud illuminated with red light.

If the smart cover 26 determines that the volume of fluid 14 dispensed from the fluid dispenser 10 is less than the threshold volume, the controller 56 preferably controls the illumination device 54 to emit a red light. The red light is likewise transmitted from the illumination device 54 into the light transmitting middle layer 42, which transmits the red light to the forward facing edge 46 so that the forward facing edge 46 is illuminated by the red light as shown in FIG. 6. The color red is represented in FIG. 6 by vertical stripes. The red illuminated forward facing edge 46 also preferably has a visually striking appearance that is immediately noticeable by the user, so that the user recognizes and understands that an insufficient volume of the fluid 14 has been dispensed. The user can then activate the lever 12 again, until a sufficient volume of the fluid 14 has been dispensed, at which time the forward facing edge 46 will be illuminated in green light in the manner as described above.

The shroud 28 thus acts as an illuminatable structure 64 having a light display area 66, in the form of the forwardly facing edge 46, which can be illuminated to convey information to the user, in this case information about the volume of fluid that has been dispensed. The illumination of the shroud 28 could also be used to convey other types of information as well. For example, the controller 56 could be configured to control the illumination device 54 to emit a flashing red light if the controller 56 determines that the dispenser 10 requires service, for example because the fluid reservoir 22 is empty. This causes the forward facing edge 46 to become illuminated off and on by the flashing red light, signaling to a user that the dispenser 10 is out of order and/or to maintenance staff that the dispenser 10 requires servicing.

Reference is now made to FIGS. 7 to 13, which show a fluid dispenser 10 in accordance with a second embodiment of the invention. The fluid dispenser 10 shown in FIGS. 7 to 13 is identical to the dispenser 10 shown in FIGS. 1 to 6, with the exception that the dispenser 10 shown in FIGS. 7 to 13 is adapted to have an upper light display area 68, a middle light display area 70, and a lower light display area 72, and is adapted to be operated touchlessly rather than by a manually operated actuator lever 12. Like numerals are used to denote like components.

Figure 7:
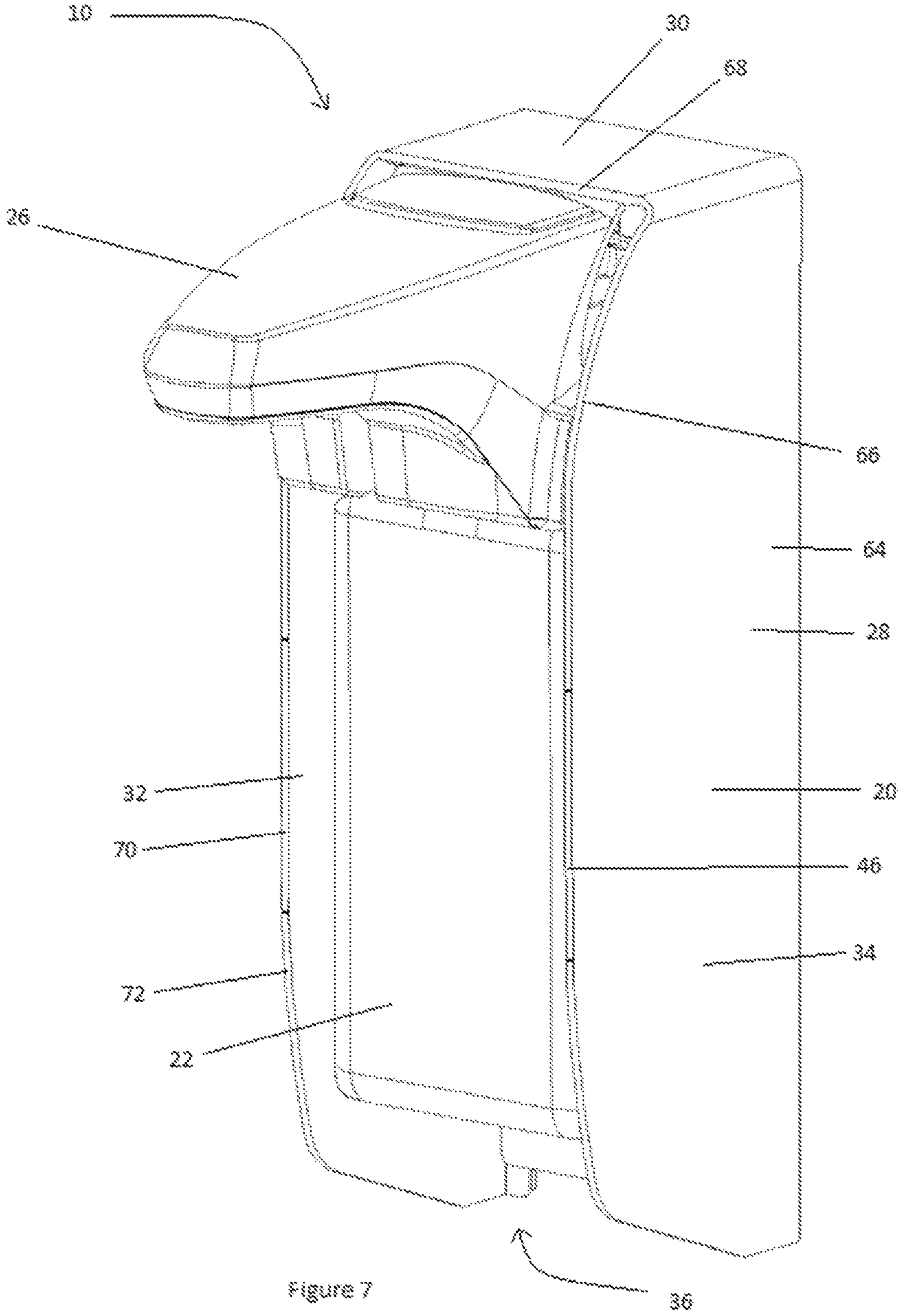
FIG. 7 is a perspective view of a fluid dispenser in accordance with a second embodiment of the present invention.

As can be seen in FIG. 7, the fluid dispenser 10 does not include an actuator lever 12. Instead, the dispenser 10 is activated touchlessly, for example by an electronic pump mechanism that is activated when a user's hand 18 is detected in the area below the smart cover 26, as is known in the art. Any suitable mechanism for providing touchless operation could be used, including for example those described in U.S. Pat. No. 7,984,825 to Ophardt et al., issued Jul. 26, 2011; U.S. Pat. No. 8,397,949 to Ophardt, issued Mar. 19, 2013; U.S. Pat. No. 9,027,788 to Ophardt et al., issued May 12, 2015; U.S. Pat. No. 8,622,243 to Ophardt et al., issued Jan. 7, 2014; U.S. Pat. No. 8,733,596 to Ophardt et al., issued May 27, 2004; and U.S. Pat. No. 7,455,197 to Ophardt, issued Nov. 25, 2008, which are incorporated herein by reference.

Figure 8:
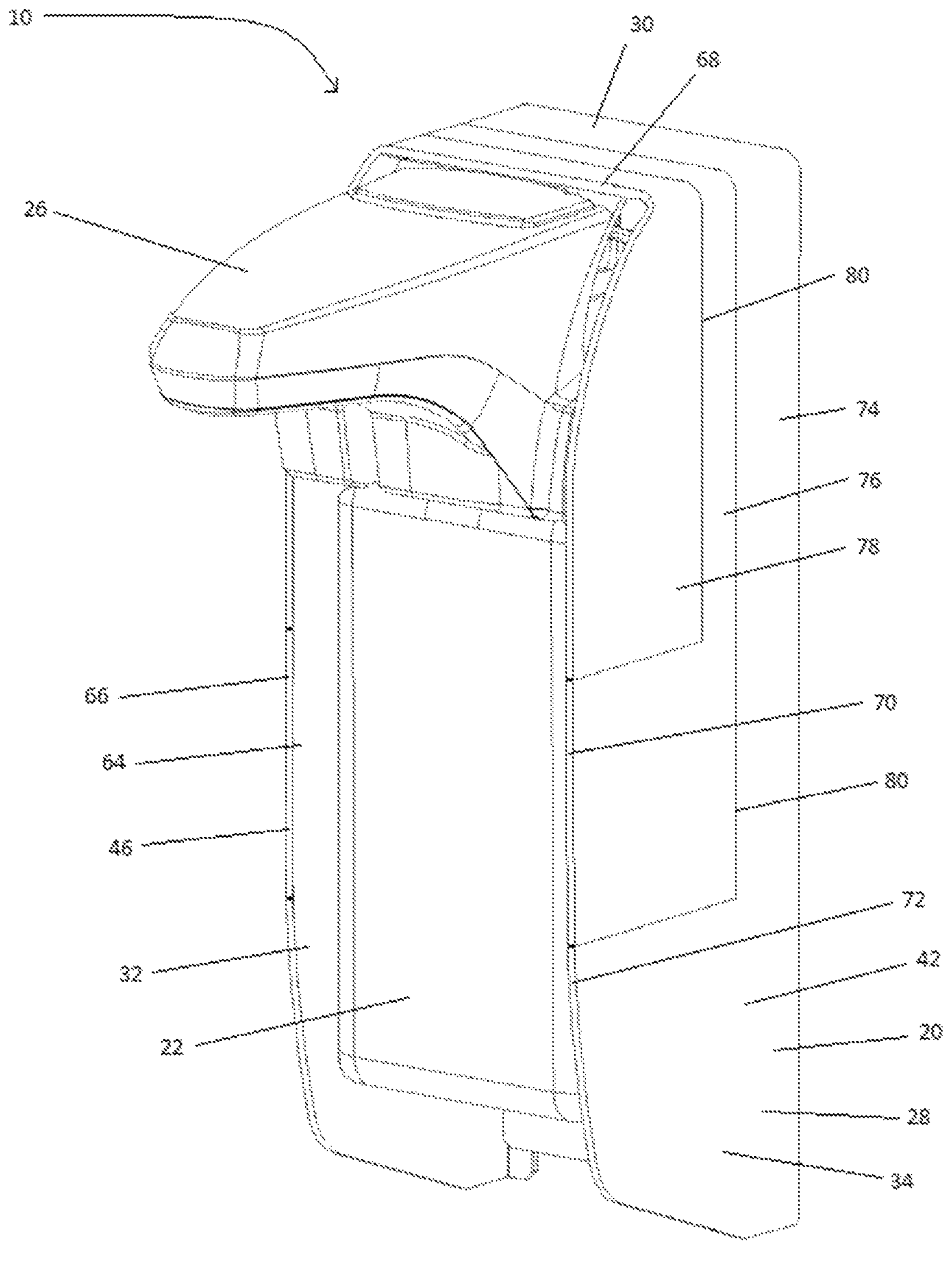
FIG. 8 is a perspective view of the fluid dispenser shown in FIG. 7, with an outer layer of the shroud removed so that a light transmitting middle layer of the shroud is visible.

As is best shown in FIG. 8, the middle layer 42 of the shroud 28 is divided into a first light transmitting zone 74, a second light transmitting zone 76, and a third light transmitting zone 78, each of which are formed by a light transmitting material, such as translucent polyethylene. Two thin barriers 80 formed from a light blocking material, such as an opaque black, white or silver polyethylene, separate the first light transmitting zone 74 from the second light transmitting zone 76, and the second light transmitting zone 76 from the third light transmitting zone 78. The barriers 80 prevent light from being transmitted between the first light transmitting zone 74, the second light transmitting zone 76, and the third light transmitting zone 78. Preferably, the barriers 80 are formed from a material that reflects light, to assist in the propagation of light though the light transmitting zones 74, 76, 78.

As in the embodiment shown in FIGS. 1 to 6, in the embodiment shown in FIGS. 7 to 13 the middle layer 42 of the shroud 28 is exposed forwardly at the forward facing edge 46, which forms a light display area 66. The light display area 66 is divided by the barriers 80 into the lower light display area 72, the middle light display area 70, and the upper light display area 68. The portion of the forward facing edge 46 at the bottom of the left side wall 32 and the right side wall 34 where the first light transmitting zone 74 is forwardly exposed is the lower light display area 72; the portion of the forward facing edge 46 in the middle of the left side wall 32 and the right side wall 34 where the second light transmitting zone 76 is forwardly exposed is the middle light display area 70; and the portion of the forward facing edge 46 on the top wall 30 and at the top of the left side wall 32 and the right side wall 34 where the third light transmitting zone 78 is forwardly exposed is the upper light display area 68.

Figure 10:
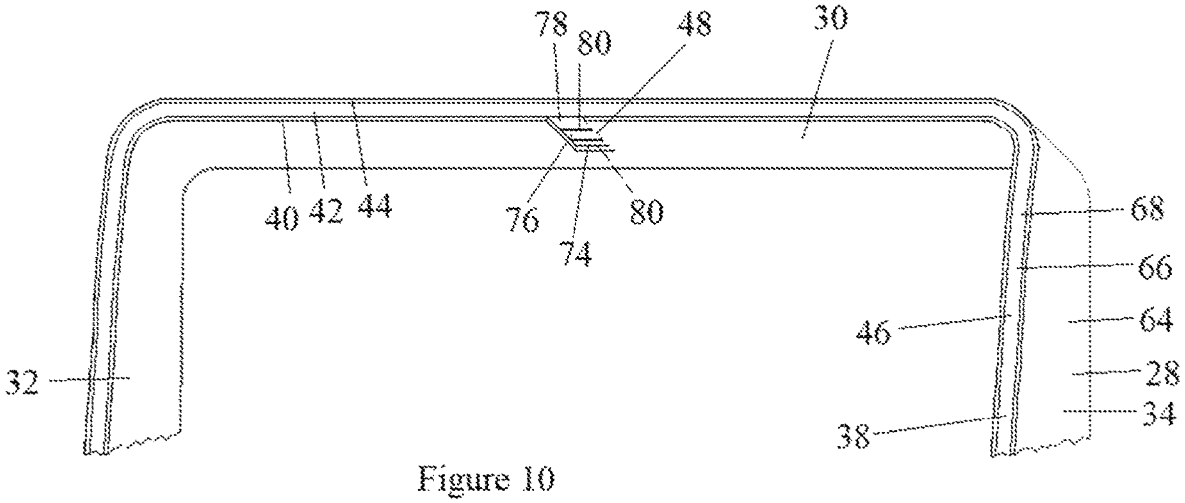
FIG. 10 is an enlarged front perspective view of the upper portion of the shroud of the fluid dispenser shown in FIG. 7.

As shown in FIG. 10, the shroud 28 has a small rectangular light receiving area 48 located at the center of the front edge of the top wall 30 where the opaque first side layer is removed, so that a downwardly facing bottom surface of the middle layer 42 is exposed. The light receiving area 48 extends rearwardly from the front edge of the top wall 30 so that a portion of the first light transmitting zone 74, a portion of the second light transmitting zone 76, and a portion of the third light transmitting zone 78 are exposed in the light receiving area 48.

Figure 9:
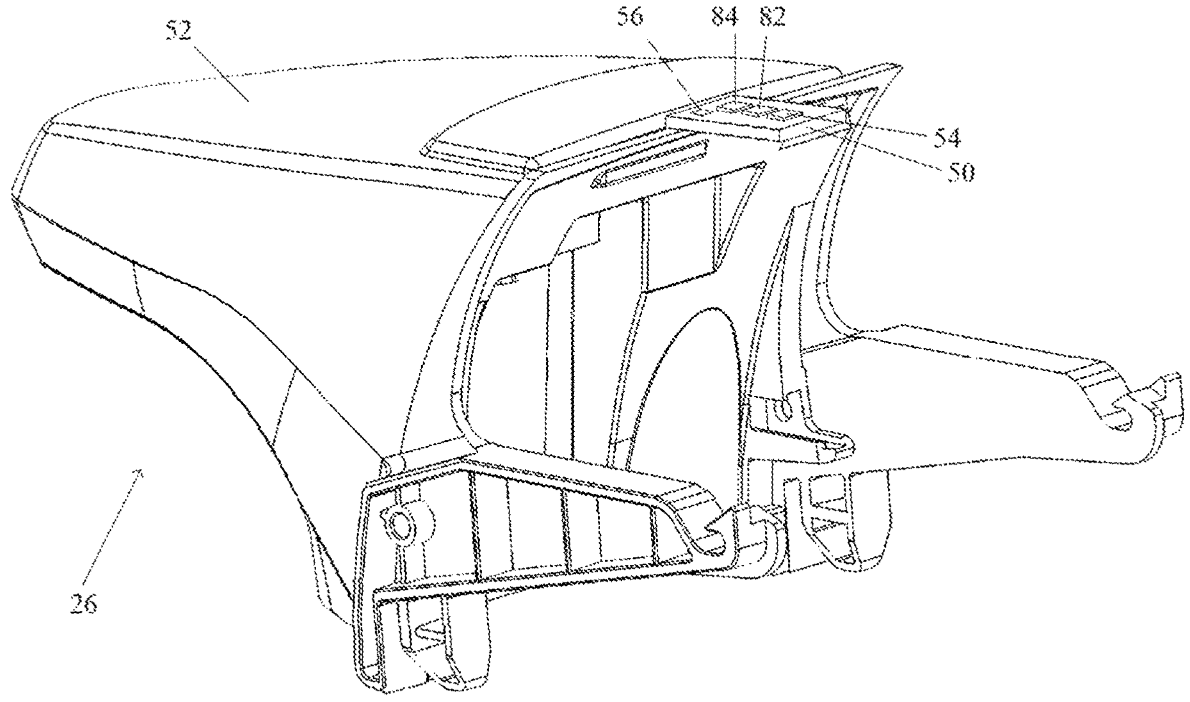
FIG. 9 is a rear perspective view of the smart cover of the fluid dispenser shown in FIG. 7.

As shown in FIG. 9, the light carrying tab 50 carries a first illumination device 54, a second illumination device 82, and a third illumination device 84, in addition to the controller 56. The first illumination device 54, the second illumination device 82, and the third illumination device 84 are preferably LED lights that are capable of emitting one, two, three, or more different colors independently of each other. The controller 56 controls the first illumination device 54, the second illumination device 82, and the third illumination device 84. The first illumination device 54, the second illumination device 82, and the third illumination device 84 are positioned facing upwardly on the light carrying tab 50, with the third illumination device 54 positioned closest to the cover body 52, the second illumination device 76 spaced rearwardly from the third illumination device 54, and the first illumination device 74 spaced rearwardly from the second illumination device 76. When the smart cover 26 is attached to the housing 20 in the manner as shown in FIG. 7, the first illumination device 74 is located adjacent to the first light transmitting zone 74 in the light receiving area 48 of the shroud 28; the second illumination device 82 is located adjacent to the second light transmitting zone 76 in the light receiving area 48 of the shroud 28; and the third illumination device 84 is located adjacent to the third light transmitting zone 78 in the light receiving area 48 of the shroud 28.

A preferred manner of operating the fluid dispenser 10 will now be described with reference to FIGS. 7 to 13. To dispense hand cleaning fluid 14 from the fluid outlet 16 onto a user's hand 18, the user's hand 18 is placed under the smart cover 26 where it is detected by a sensor arrangement, not shown, as is known in the art. Upon detecting the presence of the user's hand 18, an electronic pump mechanism is activated to dispense an allotment of the fluid 14 from the fluid reservoir 22 onto the user's hand 18. Preferably, the smart cover 26 is configured to determine the volume of fluid 14 remaining within the fluid reservoir 22. This can be accomplished by any suitable mechanism or method, including for example by subtracting an expected or known volume of fluid 14 dispensed with each activation from the known initial volume of fluid contained in the reservoir 22, as is known in the art.

Preferably, the controller 56 conveys information about the volume of fluid 14 remaining in the reservoir 22 by selectively illuminating the upper light display area 68, the middle light display area 70, and the lower light display area 72. For example, when the fluid reservoir 22 is full, the controller 56 could be configured to illuminate each of the first illumination device 54, the second illumination device 82, and the third illumination device 84 with blue light. The blue light emitted from the first illumination device 54 is transmitted into the first light transmitting zone 74, which transmits the blue light to the lower light display area 72 of the forward facing edge 46, causing the lower light display area 72 to become illuminated by the blue light; the blue light emitted from the second illumination device 82 is transmitted into the second light transmitting zone 76, which transmits the blue light to the middle light display area 70 of the forward facing edge 46, causing the middle light display area 70 to become illuminated by the blue light; and the blue light emitted from the third illumination device 84 is transmitted into the third light transmitting zone 78, which transmits the blue light to the upper light display area 68 of the forward facing edge 46, causing the upper light display area 68 to become illuminated by the blue light.

Figure 11:
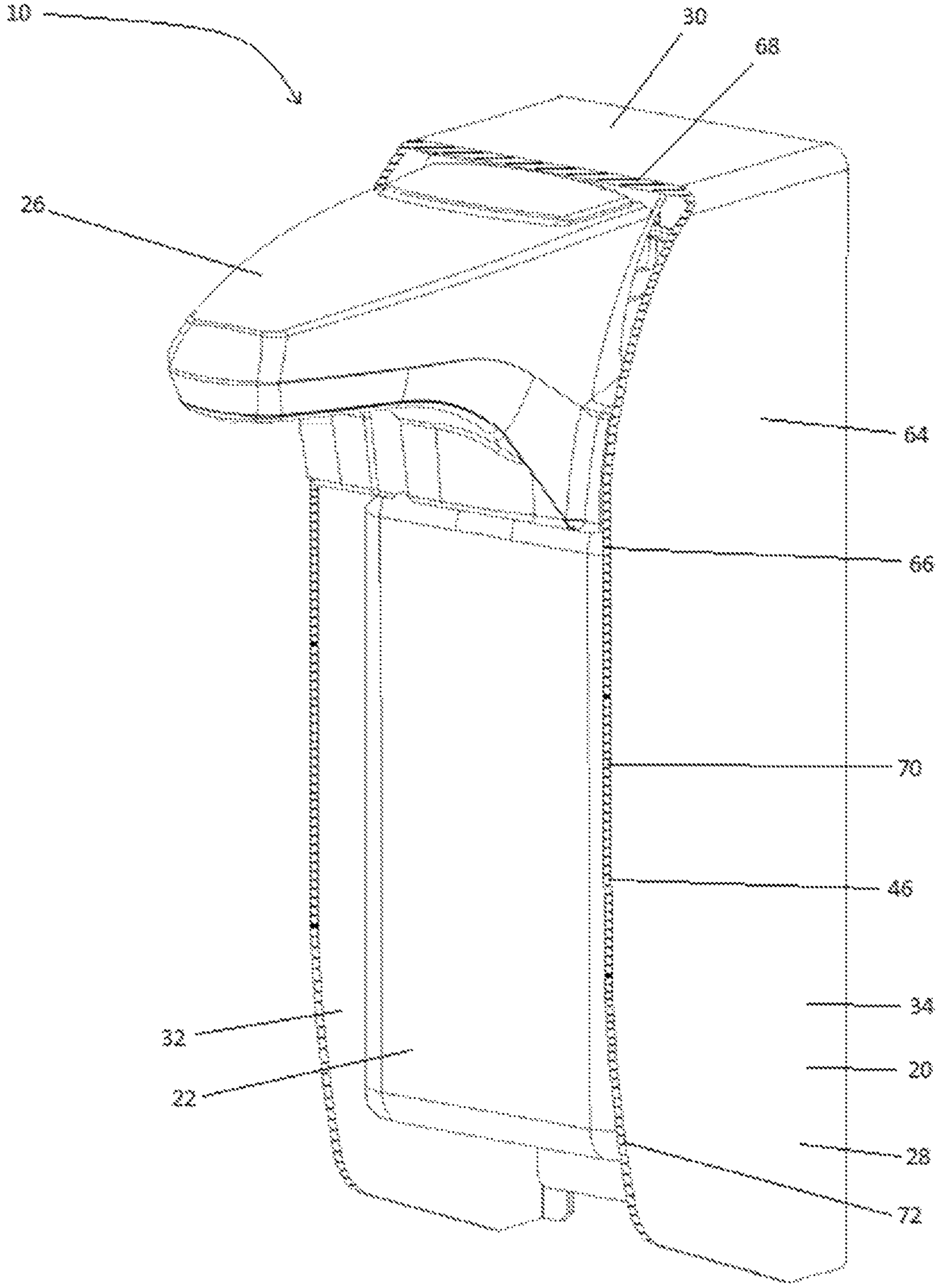
FIG. 11 is a perspective view of the fluid dispenser shown in FIG. 7, with a lower light display area, a middle light display area, and an upper light display area of the forward facing edge of the shroud illuminated with blue light.

The fluid dispenser 10 with the upper light display area 68, the middle light display area 70, and the lower light display area 72 all illuminated by blue light is shown in FIG. 11. The color blue is represented in FIG. 11 by horizontal stripes. The illumination of the upper light display area 68, the middle light display area 70, and the lower light display area 72 provides a visually striking display of the volume of fluid 14 remaining in the reservoir 22 that is preferably clearly visible from a distance. This, for example, allows maintenance staff to easily see that the fluid reservoir 22 is full without having to approach or closely examine the dispenser 10.

Figure 12:
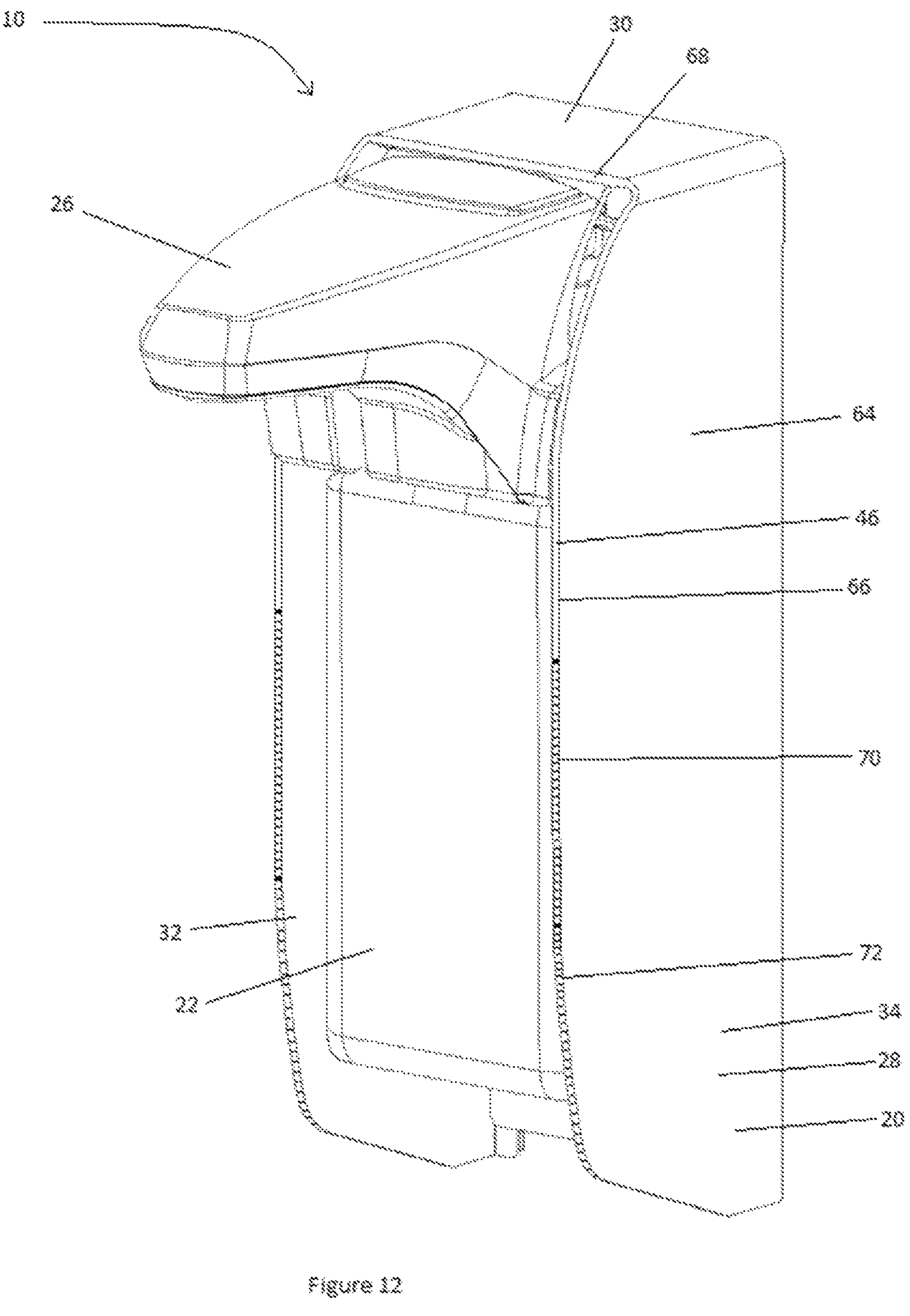
FIG. 12 is a perspective view of the fluid dispenser shown in FIG. 7, with the lower light display area and the middle light display area of the forward facing edge of the shroud illuminated with blue light.

When the reservoir 22 is half empty, the controller 56 could be configured to illuminate only the first illumination device 54 and the second illumination device 82 with blue light, and to leave the third illumination device 84 unilluminated or off. This causes the middle light display area 70 and the lower light display area 72 to become illuminated by the blue light, as shown in FIG. 12. The barrier 80 between the second light transmitting zone 76 and the third light transmitting zone 78 prevents the blue light from being transmitted from the second light transmitting zone 76 to the third light transmitting zone 78, so that the upper light display area 68 remains unilluminated. The illumination of the middle light display area 70 and the lower light display area 72 again provides a visually striking display of the volume of fluid 14 remaining in the reservoir 22 that is preferably clearly visible from a distance, so that maintenance staff can easily see that the fluid reservoir 22 is half empty without having to approach or closely examine the dispenser 10.

Figure 13:
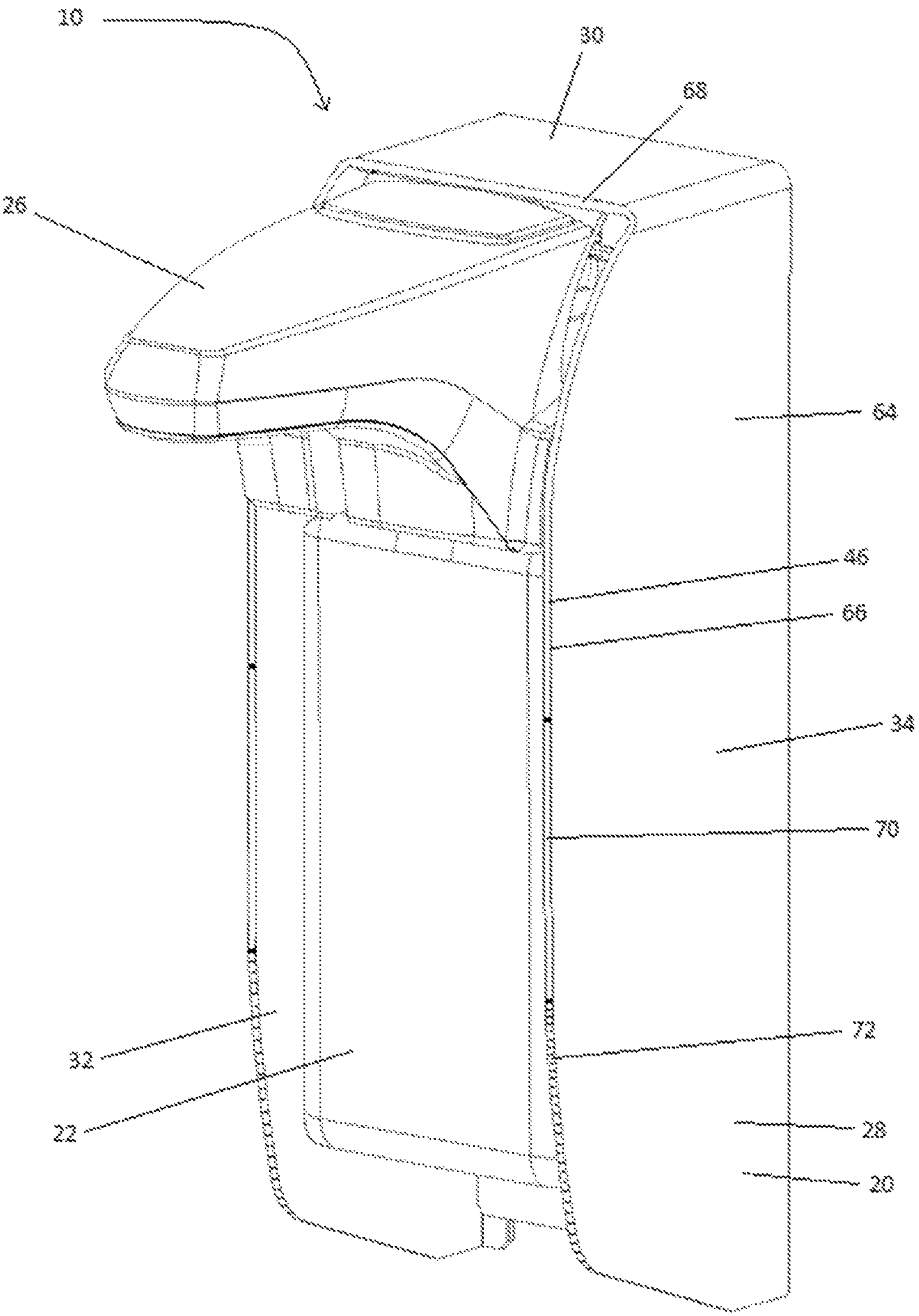
FIG. 13 is a perspective view of the fluid dispenser shown in FIG. 7, with the lower light display area of the forward facing edge of the shroud illuminated with blue light.

When the reservoir 22 is almost empty, the controller 56 could be configured to illuminate only the first illumination device 54 with blue light, and to leave the second illumination device 82 and the third illumination device 84 unilluminated or off. This causes the lower light display area 72 to become illuminated by the blue light, as shown in FIG. 13. The barrier 80 between the first light transmitting zone 74 and the second light transmitting zone 76 prevents the blue light from being transmitted from the first light transmitting zone 74 to the second light transmitting zone 76 and the third light transmitting zone 78, so that the upper light display area 68 and the middle light display area 70 remain unilluminated. The illumination of the lower light display area 72 again provides a visually striking display of the volume of fluid 14 remaining in the reservoir 22 that is preferably clearly visible from a distance, so that maintenance staff can easily see that the fluid reservoir 22 is almost empty.

Preferably, the controller 56 is configured to illuminate the lower light display area 72 with the blue light, and to leave the upper light display area 68 and the middle light display area 70 unilluminated, as shown in FIG. 13, when the quantity of fluid 14 remaining in the reservoir 22 is less than or equal to a threshold quantity. The threshold quantity is preferably selected so that, if maintenance staff are instructed to refill or replace the fluid reservoirs 22 of dispensers 10 in which only the lower light display area 72 is illuminated in blue light, then maintenance staff will on average have enough time to refill or replace the reservoirs 22 before the reservoirs 22 completely run out of fluid 14. This preferably substantially avoids having dispensers 10 that have completely run out of fluid 14 and are therefore unable to dispense fluid 10 when needed. Optionally, when the quantity of fluid 14 remaining in the reservoir 22 is less than or equal to the threshold quantity, the lower light display area 72 is illuminated with red light rather than blue light, to more clearly communicate to maintenance staff that the reservoir 22 needs to be refilled or replaced.

In the event that a dispenser 10 does run out of fluid 14, the controller 56 is preferably configured to illuminate one, two, or preferably all three of the first illumination device 54, the second illumination device 82, and the third illumination device 84 with flashing red light. This causes the entire forward facing edge 46 to become illuminated by the flashing red light, which signals to users and/or maintenance staff that the dispenser 10 is out of order and requires service.

The smart cover 26 is also preferably configured to determine whether a threshold volume of fluid 14 has been dispensed onto a user's hand 18, as in the first embodiment shown in FIGS. 1 to 6. If the volume of fluid 14 dispensed onto the user's hand 18 is equal to or greater than the threshold volume, the controller 56 preferably illuminates all three of the first illumination device 54, the second illumination device 82, and the third illumination device 84 with green light. This causes the entire forward facing edge 46 to become illuminated by the green light, which signals to the user that a sufficient volume of fluid 14 has been dispensed. If the volume of fluid 14 dispensed onto the user's hand 18 is less than the threshold volume, the controller 56 preferably illuminates all three of the first illumination device 54, the second illumination device 82, and the third illumination device 84 with red light. This causes the entire forward facing edge 46 to become illuminated by the red light, which signals to the user that an insufficient volume of fluid 14 has been dispensed, and that the dispenser 10 should be activated again to dispense more fluid 14. Once a preselected amount of time has passed since the last activation of the dispenser 10, the controller 56 preferably controls the first illumination device 54, the second illumination device 82, and the third illumination device 84 to again display the volume of fluid 14 remaining in the reservoir 22, by selectively illuminating the upper light display area 68, the middle light display area 70, and the lower light display area 72 with blue light as described above.

Although not shown in the drawings, the housing 20 could optionally incorporate a front plate extending between the side walls 32 and 34 to at least partially cover the reservoir 22, as is known in the art. The front plate could optionally display a visual aid to assist users in interpreting the different colors of light that are displayed on the light display area 66. For example, the front plate could display a message stating "If the forward facing edge of the dispenser turns green, a sufficient volume of hand sanitizer has been dispensed. If the forward facing edge of the dispenser turns red, please activate the dispenser again to dispense an additional allotment of hand sanitizer." The visual aid also preferably includes colored elements that match the different colors of light that may be displayed on the light display area 66. For example, in the message reproduced above the word "green" could be written in the same color of green that the light display area 66 displays when a sufficient volume of fluid 14 has been dispensed, and the word "red" could be written in the same color of red that the light display area 66 displays when an insufficient volume of fluid 14 has been dispensed.

Optionally, the barriers 80 could have a larger width than is shown in the drawings, so that for example a smaller area of the forward facing edge 46 becomes illuminated when the illumination devices 54, 82, 84 are activated. For example, the barriers 80 could be expanded so that each of the upper light display area 68, the middle light display area 70, and the lower light display area 72 encompass only a relatively small portion of the forward facing edge 46, which are spaced vertically from each other on the side walls 32 and 34. The front plate could also be provided with visual indicia displayed adjacent to each of the upper light display area 68, the middle light display area 70, and the lower light display area 72 to assist a user in interpreting the information that is being conveyed when the upper light display area 68, the middle light display area 70, and/or the lower light display area 72 is illuminated. For example, the controller 56 could be configured to illuminate only the upper light display area 68 when the reservoir 22 is full; to illuminate only the middle light display area 70 when the reservoir 22 is half full; and to illuminate only the lower light display area 72 when the reservoir 22 is almost empty. The front plate could for example display the word "full" adjacent to the upper light display area 68; the words "half full" adjacent to the middle light display area 70; and the words "almost empty" adjacent to the lower light display area 72. Alternatively, symbols showing a bottle full of fluid 14, a bottle half full of fluid 14, and a bottle almost empty of fluid 14 could be displayed adjacent to the upper light display area 68, the middle light display area 70, and the lower light display area 72, respectively.

Figure 14:
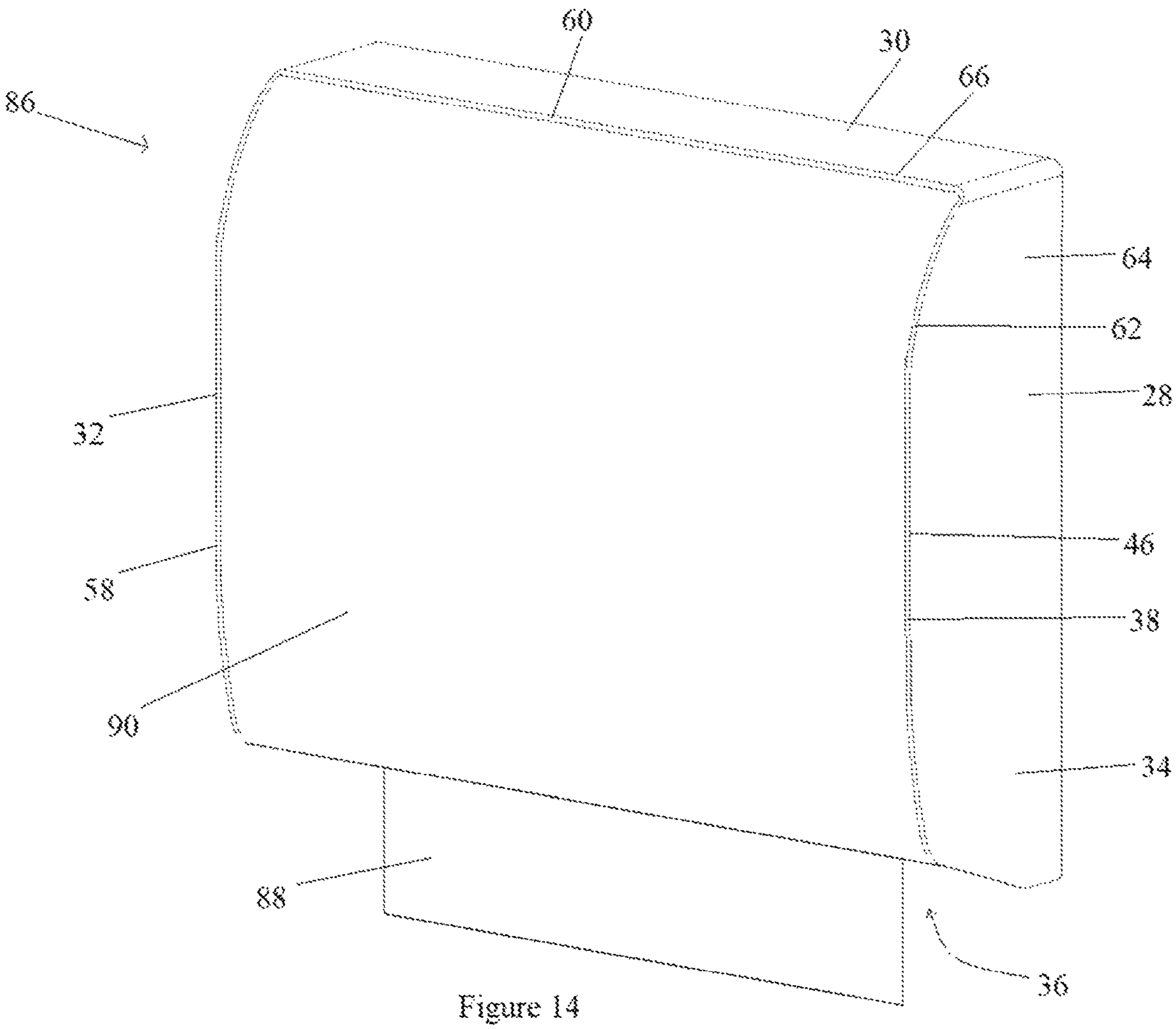
FIG. 14 is a perspective view of a paper towel dispenser in accordance with a third embodiment of the present invention, with a sheet of paper towel extending from a bottom opening of the dispenser.
Figure 15:
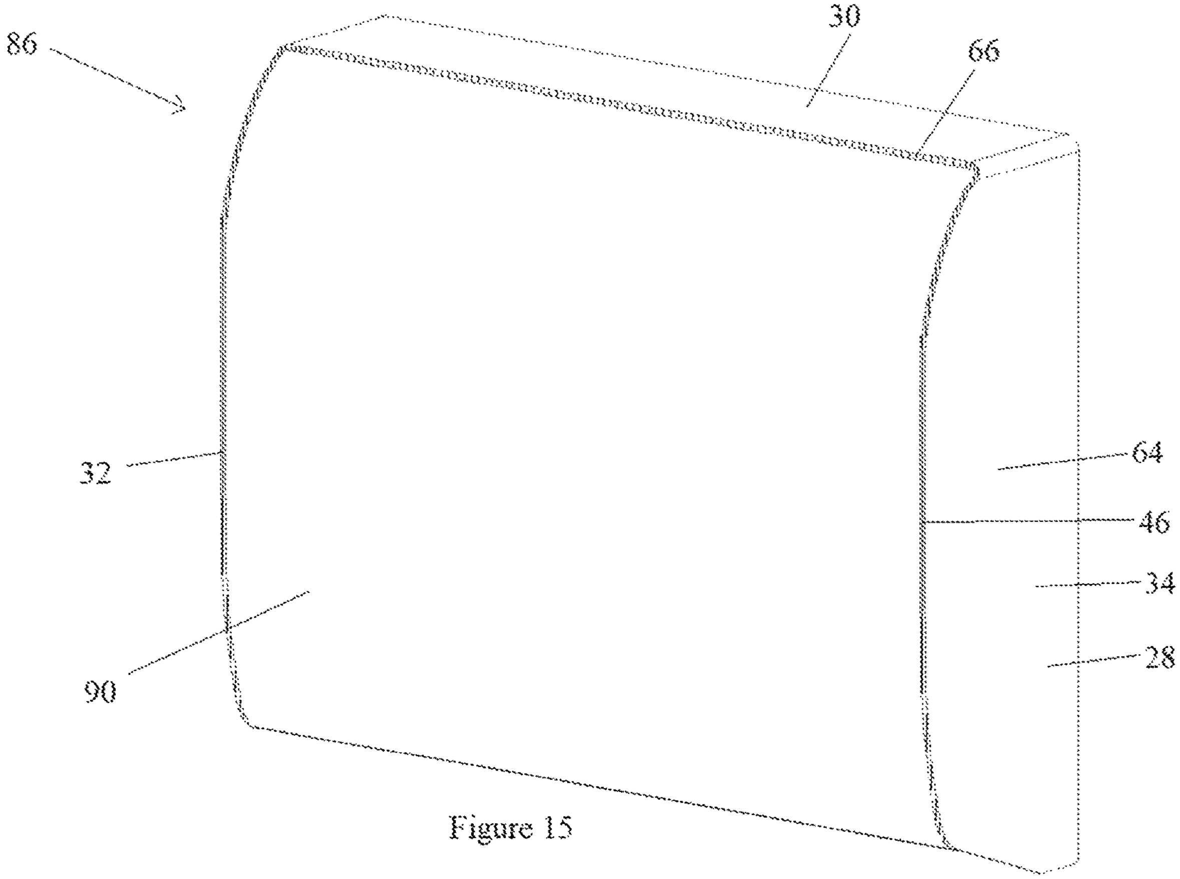
FIG. 15 is a perspective view of the paper towel dispenser shown in FIG. 14, with a forward facing edge of a shroud of the dispenser illuminated with red light.

Reference is now made to FIGS. 14 and 15, which show a paper towel dispenser 86 in accordance with a third embodiment of the present invention. Like numerals are used to denote like components.

The paper towel dispenser 86 has a shroud 28 that is identical to the shroud 28 of the fluid dispenser 10 shown in FIGS. 1 to 6, with the exception that the top wall 30 has an extended length so that the inner cavity 36 defined by the top wall 30 and the two side walls 32 and 34 is large enough to carry a supply of paper towels 88. As in the previous embodiments, the shroud 28 is formed from a laminate material 38 having an opaque first side layer 40, a light transmitting middle layer 42, and an opaque second side layer 44. The shroud 28 acts as an illuminatable structure 64 and has a forward facing edge 46 that serves as an illuminatable light display area 66. The paper towel dispenser 86 also has a controller 56 and an illumination device 54 similar to those shown in FIGS. 1 to 13, but which are not visible in FIGS. 14 and 15. The illumination device 54 extends rearwardly from a top edge of a front panel 90 of the paper towel dispenser 86. As in the previous embodiments shown in FIGS. 1 to 13, the illumination device 54 is positioned adjacent to a light receiving area 48 of the shroud 28 for emitting light into the light transmitting middle layer 42 of the shroud 28. The light transmitting middle layer 42 transmits the light received from the illumination device 54 to the forward facing edge 46 of the shroud 28, so that the forward facing edge 46 becomes illuminated.

The controller 56 preferably controls the illumination device 54 to convey information to users of the paper towel dispenser 86. For example, when the paper towel dispenser 86 has run out of paper towels 88 as shown in FIG. 15, the controller 56 preferably illuminates the illumination device 54 with a flashing red light. This causes the entire forward facing edge 46 of the paper towel dispenser 86 to become illuminated in flashing red light, which preferably provides a visually striking display that signals to users and/or maintenance staff that the paper towel dispenser 86 is out of order and requires service.

The controller 56 could also be configured to display other types of information by illuminating the forward facing edge 46. For example, the controller 56 could be configured to illuminate the forward facing edge 46 in a variety of different colors, for example in a sequenced pattern, that is intended to draw a user's attention to the paper towel dispenser 86 so that the user notices and is able to easily locate the paper towel dispenser 86.

The embodiments shown in FIGS. 1 to 15 and described above therefore each provide an apparatus comprising: an illumination device 54; and an illuminatable structure 64; wherein the illuminatable structure 64 comprises a laminate material 38 having an opaque first side layer 40, a light transmitting middle layer 42, and an opaque second side layer 44; wherein the illuminatable structure 64 has a light display area 66 where the light transmitting middle layer 42 is exposed; and wherein the illumination device 54 emits light into the light transmitting middle layer 42 of the illuminatable structure 64, and the light transmitting middle layer 42 transmits the light to the light display area 66 so that the light display area 66 becomes illuminated.

The embodiments shown in FIGS. 1 to 15 and described above therefore also each provide a method of operating an apparatus, the apparatus comprising: an illumination device 54; and an illuminatable structure 64; wherein the illuminatable structure 64 comprises a laminate material 38 having an opaque first side layer 40, a light transmitting middle layer 42, and an opaque second side layer 44; and wherein the illuminatable structure 64 has a light display area 66 where the light transmitting middle layer 42 is exposed; the method comprising: emitting light from the illumination device 54 into the light transmitting middle layer 42 of the illuminatable structure 64, the light transmitting middle layer 42 transmitting the light to the light display area 66 so that the light display area 66 becomes illuminated.

It will be understood that, although various features of the invention have been described with respect to one or another of the embodiments of the invention, the various features and embodiments of the invention may be combined or used in conjunction with other features and embodiments of the invention as described and illustrated herein.

The invention is not limited to the particular constructions of the fluid dispenser 10 and the paper towel dispenser 86 shown in the drawings. Rather, the invention could be used with any type of apparatus, including apparatuses that dispense other types of products or that have another function. For example, the invention could be incorporated into a waste paper bin, a faucet, a sink, a doorway, a toilet, a desk, or a countertop. The illuminatable structure 64 could also be a structure other than a shroud 28. For example, the illuminatable structure 64 could be an actuator lever 12, a fluid reservoir 22, or a smart cover 26 that are formed at least in part by a laminate material 38 having an opaque first side layer 40, a light transmitting middle layer 42, and an opaque second side layer 44. The light display area 66 also need not be a forward facing edge 46. Rather, any suitable location for displaying the light could be used, including for example part or all of a forwardly, upwardly, downwardly, rearwardly, and/or sideways directed edge or surface of the apparatus, or any combination thereof.

The illumination device 54 need not be an LED light as described in the preferred embodiments. Rather, any device 54 that is capable of emitting light could be used. The illumination device 54 and the light receiving area 48 also need not be in the positions shown in the drawings. Rather, the illumination device 54 could be positioned at any suitable location for directing light into the light transmitting middle layer 42 of the laminate material 38. For example, the illumination device 54 could be arranged adjacent to the forward facing edge 46 of the shroud 28 for directing the emitted light rearwardly into the light transmitting middle layer 42, rather than being arranged adjacent to a light receiving area 48 where the opaque first side layer 40 has been removed. The light transmitting middle layer 42 could also be partially or completely removed from the light receiving area 48 to produce a cavity within the light transmitting middle layer 42 for receiving the illumination device 54. With the illumination device 54 received in a cavity of the light transmitting middle layer 42, the illumination device 54 is optionally able to directly emit light rearwardly and/or sideways into the light transmitting middle layer 42 parallel to the second side layer 44, which in some embodiments may improve the propagation of the light through the light transmitting middle layer 42. There could also be a greater number or a smaller number of illumination devices 54, 82, 84; light transmitting zones 74, 76, 78; and light display areas 66, 68, 70, 72 than are shown in the drawings. The illumination devices 54, 82, 84 could also emit different colors of light than has been described above, and could be capable of emitting a greater number or a smaller number of different colors of light.

The opaque first side layer 40, the light transmitting middle layer 42, and the opaque second side layer 44 could be made of any suitable materials, and are not limited to the particular materials described in the preferred embodiments. Preferably, the opaque first and second side layers 40 and 44 are at least partially reflective, to assist in the propagation of light through the light transmitting middle layer 42. The opaque first side layer 40, the light transmitting middle layer 42, and the opaque second side layer 44 could have any suitable thicknesses and material qualities. In one preferred embodiment, the opaque first side layer 40 is formed from aluminum and has a thickness of about 0.5 mm, the light transmitting middle layer 42 is formed from polyethylene and has a thickness of about 2 mm, and the opaque second side layer 44 is formed from aluminum and has a thickness of about 0.5 mm.

The laminate material 38 is optionally formed as a flat sheet by layering the opaque first side layer 40, the light transmitting middle layer 42, and the opaque second side layer 44 on top of each other, and laminating the three layers 40, 42, 44 together. The flat sheet can then be bent to form the shroud 28, so that the side walls 32 and 34 are parallel to each other and perpendicular to the top wall 30. Optionally, the flat sheet is cut into the shape of the shroud 28 before it is bent. Alternatively, the opaque first side layer 40, the light transmitting middle layer 42, and the opaque second side layer 44 could be moulded, cast, cut, or otherwise formed into the shape of the shroud 28 prior to being layered on top of each other.

The invention could be incorporated into other fluid dispenser 10 constructions, including for example those taught in U.S. Pat. No. 8,245,877 to Ophardt, issued Aug. 21, 2012; U.S. Pat. No. 8,113,388 to Ophardt et al., issued Feb. 14, 2012; U.S. Pat. No. 8,091,739 to Ophardt et al., issued Jan. 10, 2012; U.S. Pat. No. 7,748,573 to Anhuf et al., issued Jul. 6, 2010; U.S. Pat. No. 7,984,825 to Ophardt et al., issued Jul. 26, 2011; U.S. Pat. No. 8,684,236 to Ophardt, issued Apr. 1, 2014; U.S. Pat. No. 5,373,970 to Ophardt, issued Dec. 20, 1994; U.S. Pat. No. 5,836,482 to Ophardt et al., issued Nov. 17, 1998; and U.S. Pat. No. 9,682,390 to Ophardt et al., issued Jun. 20, 2017, which are each incorporated herein by reference.

Preferably, the controller 56 is configured to control the illumination of the illumination device 54 in a manner that reduces energy consumption and/or extends the battery life of a battery in the dispenser 10. For example, in the embodiment shown in FIGS. 1 to 6, the controller 56 preferably controls the illumination device 54 to emit the red or green light for only a short period of time after each activation of the dispenser 10. For example, the illumination device 54 could be illuminated for 1 to 30 seconds; 3 to 10 seconds; or 5 seconds after each activation, to give a user sufficient time to notice and interpret the light, without wasting battery power by leaving the light illuminated for longer than necessary. In the embodiment shown in FIGS. 7 to 13, the controller 56 is also preferably configured to save battery power by limiting the illumination of the illumination devices 54, 82, 84. For example, the controller 56 could be in communication with a person sensor that senses when a person has entered the room where the dispenser 10 is located. When a person enters the room, the controller 56 preferably controls the illumination devices 54, 82, 84 to display the volume of fluid 14 remaining in the reservoir 22 in the manner as described above. After a preselected amount of time has passed, the controller 56 is preferably configured to turn off the illumination devices 54, 82, 84 to save power. The preselected time is preferably selected to give the person enough time to notice and interpret the lights, without wasting battery power by leaving the lights illuminated for longer than necessary or when no one is present in the room where the dispenser 10 is located. The preselected time period could for example be from 10 seconds to 20 minutes; 1 minute to 10 minutes; or 5 minutes after a person is detected. Optionally, the controller 56 could be configured to display the volume of fluid 14 remaining in the reservoir 22 only when a maintenance worker has entered the room and/or approached the dispenser 10, for example by detecting a maintenance worker identifier such as key fob or an RFID tag carried by the maintenance worker. The flashing red light when the dispenser 10 is empty or out-of-order could also preferably be controlled to reduce battery consumption. For example, the controller 56 could be configured to turn on the flashing red light for only a preselected time period after a person is detected in the room where the dispenser 10 is located. Alternatively, the flashing red light could be turned on only for a preselected time period after a user's hand 18 is detected below the fluid outlet 16. This preferably discourages the user from repeatedly placing the user's hand 18 below the fluid outlet 16 when the reservoir 22 is empty, thus preferably avoiding unnecessary battery draining activations of the pump mechanism 24. Optionally, the blue light displaying the volume of fluid 14 remaining in the reservoir 22 could also be provided only when a user's hand 18 is placed below the fluid outlet 16, as a battery saving measure.

Although the fluid 14 is preferably a hand cleaning fluid 14, such as hand soap or hand sanitizer, the dispenser 10 could be used to dispense other fluids 14 as well. The term "fluid" as used herein includes any flowable substance, including liquids, foams, emulsions, and dispersions.

As used herein, the term "laminate" refers to a composite material that has two or more different layers. Any suitable manner of connecting or bonding the layers together could be used.

Although this disclosure has described and illustrated certain preferred embodiments of the invention, it is to be understood that the invention is not restricted to these particular embodiments. Rather, the invention includes all embodiments which are functional, optical, or mechanical equivalents of the specific embodiments and features that have been described and illustrated herein.

We claim:

1. An apparatus comprising:

an illumination device; and an illuminatable structure;

wherein the illuminatable structure comprises a laminate material having an opaque first side layer, a light transmitting middle layer, and an opaque second side layer;

wherein the illuminatable structure has a light display area where the light transmitting middle layer is exposed; and wherein the illumination device emits light into the light transmitting middle layer of the illuminatable structure, and the light transmitting middle layer transmits the light to the light display area so that the light display area becomes illuminated.

2. The apparatus according to claim 1, wherein the light display area comprises an edge of the laminate material.

3. The apparatus according to claim 1, further comprising a controller that controls the illumination device;

wherein the controller controls the emission of the light from the illumination device to convey information to a user of the apparatus.

4. The apparatus according to claim 3, wherein the information conveyed to the user of the apparatus comprises information about the apparatus.

5. The apparatus according to claim 3, wherein the apparatus is a dispensing apparatus for dispensing a material; and wherein the information conveyed to the user of the apparatus comprises at least one of:

information about a quantity of the material remaining in the dispensing apparatus;

information about an operational state of the dispensing apparatus;

information about a quantity of the material that has been dispensed from the dispensing apparatus;

information about whether the dispensing apparatus is out-of-order; and information about whether the dispensing apparatus requires servicing.

6. The apparatus according to claim 5, wherein the dispensing apparatus comprises a fluid dispenser for dispensing hand cleaning fluid; and wherein the information conveyed to the user of the apparatus comprises information about a quantity of the hand cleaning fluid that has been dispensed onto the user's hand.

7. The apparatus according to claim 6, wherein the controller changes an operational state of the illumination device when a threshold quantity of the hand cleaning fluid has been dispensed onto the user's hand.

8. The apparatus according to claim 7, wherein the controller changes the operational state of the illumination device by at least one of:

causing the illumination device to start emitting the light;

causing the illumination device to stop emitting the light; and causing the illumination device to emit a different color of the light.

9. The apparatus according to claim 5, wherein the light transmitting middle layer is divided into at least a first light transmitting zone and a second light transmitting zone;

wherein the illuminatable structure further comprises at least one barrier that prevents light from being transmitted between the first light transmitting zone and the second light transmitting zone;

wherein the illumination device comprises a first illumination device and the light display area comprises a first light display area, the first illumination device emitting light into the first light transmitting zone, and the first light transmitting zone transmitting the light from the first illumination device to the first light display area so that the first light display area becomes illuminated; and wherein the apparatus further comprises a second illumination device that emits light into the second light transmitting zone, the second light transmitting zone transmitting the light from the second illumination device to a second light display area so that the second light display area becomes illuminated.

10. The apparatus according to claim 9, wherein the controller controls the emission of the light from the first illumination device and the second illumination device to convey information to the user of the apparatus.

11. The apparatus according to claim 10, wherein the information conveyed to the user of the apparatus comprises information about the quantity of the material remaining in the dispensing apparatus;

wherein the controller controls the first illumination device and the second illumination device to illuminate the first light display area and the second light display area when there is a first quantity of the material remaining in the dispensing apparatus;

wherein the controller controls the first illumination device and the second illumination device to illuminate the first light display area without illuminating the second light display area when there is a second quantity of the material remaining in the dispensing apparatus; and wherein the first quantity is greater than the second quantity.

12. The apparatus according to claim 5, wherein the illuminatable structure comprises a shroud of the dispensing apparatus;

wherein the shroud has a forwardly facing front edge; and wherein the forwardly facing front edge comprises the light display area.

13. The apparatus according to claim 12, wherein the forwardly facing front edge comprises a left side portion, a top portion, and a right side portion; and wherein the light display area includes the left side portion, the top portion, and the right side portion.

14. The apparatus according to claim 12, wherein the laminate material has a light receiving area where the opaque first side layer is removed; and wherein the illumination device is positioned adjacent to the light receiving area for directing the emitted light into the light transmitting middle layer.

15. The apparatus according to claim 14, wherein the dispensing apparatus further comprises a removable smart cover that carries the illumination device;

wherein the opaque first side layer and the opaque second side layer comprise a metal;

wherein the metal comprises at least one of: aluminum, stainless steel, and copper;

wherein the light transmitting middle layer comprises a light transmitting plastic;

wherein the light transmitting plastic comprises polyethylene;

wherein the illumination device comprises a light emitting diode;

wherein the light emitting diode is capable of selectively emitting at least a first color of light and a second color of light; and wherein the opaque first side layer has a thickness of about 0.5 mm, the light transmitting middle layer has a thickness of about 2 mm, and the opaque second side layer has a thickness of about 0.5 mm.

16. The apparatus according to claim 2, further comprising a controller that controls the illumination device;

wherein the controller controls the emission of the light from the illumination device to convey information to a user of the apparatus;

wherein the information conveyed to the user of the apparatus comprises information about the apparatus;

wherein the apparatus is a dispensing apparatus for dispensing a material; and wherein the information conveyed to the user of the apparatus comprises at least one of:

information about a quantity of the material remaining in the dispensing apparatus;

information about an operational state of the dispensing apparatus;

information about a quantity of the material that has been dispensed from the dispensing apparatus;

information about whether the dispensing apparatus is out-of-order; and information about whether the dispensing apparatus requires servicing.

17. The apparatus according to claim 16, wherein the dispensing apparatus comprises a fluid dispenser for dispensing hand cleaning fluid;

wherein the information conveyed to the user of the apparatus comprises information about a quantity of the hand cleaning fluid that has been dispensed onto the user's hand;

wherein the controller changes an operational state of the illumination device when a threshold quantity of the hand cleaning fluid has been dispensed onto the user's hand;

wherein the controller changes the operational state of the illumination device by at least one of:

causing the illumination device to start emitting the light;

causing the illumination device to stop emitting the light; and causing the illumination device to emit a different color of the light;

wherein the light transmitting middle layer is divided into at least a first light transmitting zone and a second light transmitting zone;

wherein the illuminatable structure further comprises at least one barrier that prevents light from being transmitted between the first light transmitting zone and the second light transmitting zone;

wherein the illumination device comprises a first illumination device and the light display area comprises a first light display area, the first illumination device emitting light into the first light transmitting zone, and the first light transmitting zone transmitting the light from the first illumination device to the first light display area so that the first light display area becomes illuminated; and wherein the apparatus further comprises a second illumination device that emits light into the second light transmitting zone, the second light transmitting zone transmitting the light from the second illumination device to a second light display area so that the second light display area becomes illuminated.

18. The apparatus according to claim 17, wherein the controller controls the emission of the light from the first illumination device and the second illumination device to convey information to the user of the apparatus;

wherein the information conveyed to the user of the apparatus comprises information about the quantity of the material remaining in the dispensing apparatus;

wherein the controller controls the first illumination device and the second illumination device to illuminate the first light display area and the second light display area when there is a first quantity of the material remaining in the dispensing apparatus;

wherein the controller controls the first illumination device and the second illumination device to illuminate the first light display area without illuminating the second light display area when there is a second quantity of the material remaining in the dispensing apparatus;

wherein the first quantity is greater than the second quantity;

wherein the illuminatable structure comprises a shroud of the dispensing apparatus;

wherein the shroud has a forwardly facing front edge; and wherein the forwardly facing front edge comprises the light display area.

19. The apparatus according to claim 18, wherein the forwardly facing front edge comprises a left side portion, a top portion, and a right side portion;

wherein the light display area includes the left side portion, the top portion, and the right side portion;

wherein the laminate material has a light receiving area where the opaque first side layer is removed; and wherein the illumination device is positioned adjacent to the light receiving area for directing the emitted light into the light transmitting middle layer.

20. The apparatus according to claim 19, wherein the dispensing apparatus further comprises a removable smart cover that carries the illumination device;

wherein the opaque first side layer and the opaque second side layer comprise a metal;

wherein the metal comprises at least one of: aluminum, stainless steel, and copper;

wherein the light transmitting middle layer comprises a light transmitting plastic;

wherein the light transmitting plastic comprises polyethylene;

wherein the illumination device comprises a light emitting diode;

wherein the light emitting diode is capable of selectively emitting at least a first color of light and a second color of light; and wherein the opaque first side layer has a thickness of about 0.5 mm, the light transmitting middle layer has a thickness of about 2 mm, and the opaque second side layer has a thickness of about 0.5 mm.

* * * * *